(12) United States Patent
Xu et al.

(10) Patent No.: US 12,708,233 B2
(45) Date of Patent: Aug. 18, 2026

(54) AUTOMATIC SINGLE-SERVING BEVERAGE BREWING SYSTEM

(71) Applicant: TBDx Inc., Alamo, CA (US)

(72) Inventors: Qiliang Xu, Alamo, CA (US); Rui Zhou, Sunnyvale, CA (US)

(73) Assignee: TBDx Inc., Alamo, CA (US)

( * ) Notice: Subject to any disclaimer, the term of this patent is extended or adjusted under 35 U.S.C. 154(b) by 684 days.

(21) Appl. No.: 18/182,565

(22) Filed: Mar. 13, 2023

(65) Prior Publication Data

US 2023/0284821 A1 Sep. 14, 2023

Related U.S. Application Data

(63) Continuation-in-part of application No. 17/890,803, filed on Aug. 18, 2022, and a continuation-in-part of application No. 17/890,812, filed on Aug. 18, 2022.

(Continued)

(51) Int. Cl.

*A47J 31/52* (2006.01)
*A47J 31/36* (2006.01)

(Continued)

(52) U.S. Cl.

CPC ......... *A47J 31/525* (2018.08); *A47J 31/3633* (2013.01); *A47J 31/42* (2013.01);

(Continued)

(58) Field of Classification Search

CPC ...... A47J 31/525; A47J 31/3633; A47J 31/42; A47J 31/446; A47J 31/4492; A47J 31/46;

(Continued)

(56) References Cited

U.S. PATENT DOCUMENTS 5,207,148 A 5/1993 Anderson
5,364,510 A 11/1994 Carpio (Continued)

FOREIGN PATENT DOCUMENTS

CA 2714933 C 4/2015
CA 3179277 A1 12/2021

(Continued)

OTHER PUBLICATIONS

International search report and Written Opinion received for PCT Application No. PCT/US23/15123, 32 pages.

*Primary Examiner* — Phuong T Nguyen

(74) *Attorney, Agent, or Firm* — Dickinson Wright PLLC

(57) ABSTRACT

A brewing system comprises a grinder, a brewer, a capsule holder, and a controller. The grinder is configured to grind whole coffee beans into coffee grounds with adjustable coarseness. The grinder is configured to receive the whole coffee beans through a first opening above the grinder and dispense the coffee grounds through a second opening below the grinder. The brewer is configured to dispense water for brewing coffee through a third opening below the brewer, wherein the brewer is positioned laterally relative to the grinder. The capsule dock is configured to (a) hold a capsule containing a coffee filter and (b) translate the capsule from a first position under the second opening of the grinder to a second position under the third opening below the brewer. The controller is configured to control the grinder, brewer, and capsule dock.

20 Claims, 17 Drawing Sheets

Related U.S. Application Data

(60) Provisional application No. 63/319,723, filed on Mar. 14, 2022.

(51) Int. Cl.

| | |
|---|---|
| ***A47J 31/42*** | (2006.01) |
| ***A47J 31/44*** | (2006.01) |
| ***A47J 31/46*** | (2006.01) |
| ***A47J 42/06*** | (2006.01) |
| ***A47J 42/08*** | (2006.01) |
| ***A47J 42/10*** | (2006.01) |

(52) U.S. Cl.

CPC ......... *A47J 31/446* (2013.01); *A47J 31/4492* (2013.01); *A47J 31/46* (2013.01); *A47J 42/06* (2013.01); *A47J 42/08* (2013.01); *A47J 42/10* (2013.01)

(58) Field of Classification Search

CPC .. A47J 42/06; A47J 42/08; A47J 42/10; A47J 31/002; A47J 31/4403; A47J 42/50; A47J 31/407

USPC .................. 99/280, 282, 285, 286, 295, 300

See application file for complete search history.

(56) References Cited

U.S. PATENT DOCUMENTS

| | | | | |
|---|---|---|---|---|
| 5,615,601 | A * | 4/1997 | Eugstar | A47J 31/42 99/280 |
| 9,066,629 | B1 | 6/2015 | Melvin | |
| 2005/0279216 | A1 | 12/2005 | Miller | |
| 2007/0187534 | A1 * | 8/2007 | Anson | A47J 42/46 241/92 |
| 2012/0121768 | A1 | 5/2012 | Lai | |
| 2014/0005834 | A1 | 1/2014 | Hoffman | |
| 2015/0327719 | A1 | 11/2015 | Burrows | |
| 2016/0145038 | A1 | 5/2016 | Apone | |
| 2016/0192806 | A1 | 7/2016 | Pikkemaat | |
| 2016/0220067 | A1 | 8/2016 | Teahan | |
| 2016/0235249 | A1 | 8/2016 | Teahan | |
| 2016/0316970 | A1 | 11/2016 | Ryan | |
| 2018/0110369 | A1 | 4/2018 | Piras | |
| 2018/0317695 | A1 | 11/2018 | Eller | |
| 2019/0380535 | A1 | 12/2019 | Ullmann | |
| 2020/0085232 | A1 | 3/2020 | Pi | |
| 2020/0353488 | A1 | 11/2020 | Ishigami | |
| 2021/0307556 | A1 | 10/2021 | Lee | |
| 2021/0345814 | A1 | 11/2021 | Kwag | |
| 2021/0386245 | A1 * | 12/2021 | Dayton | G06Q 10/06315 |
| 2023/0284820 | A1 | 9/2023 | Xu | |
| 2023/0285997 | A1 | 9/2023 | Xu | |

FOREIGN PATENT DOCUMENTS

| | | | |
|---|---|---|---|
| EP | 1890271 | A1 | 2/2008 |
| EP | 3424375 | B1 | 12/2019 |
| EP | 3797654 | A1 | 3/2021 |
| WO | WO 2013080073 | A1 | 6/2013 |
| WO | WO 2016184584 | A1 | 11/2016 |

* cited by examiner 1100
1106
1102
1108

1100
1106
1102
1104

1100
1104
1102

400
1100
1000
406
430
406
406
406

400
1100
1000
406
430
406
406
406

102
410
402
430
400
1000
404
405
407
1102
210

102
410
402
430
400
1000
404
405
407
210

AUTOMATIC SINGLE-SERVING BEVERAGE BREWING SYSTEM

PRIORITY

The present application claims the benefit under 35 U.S.C. § 119(e) of U.S. Provisional Patent Application No. 63/319,723, filed on Mar. 14, 2022.

Additionally, the present application is a continuation-in-part under 35 U.S.C. § 120 of U.S. patent application Ser. No. 17/890,803, filed on Aug. 18, 2022, which claims the benefit under 35 U.S.C. § 119(e) of U.S. Provisional Patent Application No. 63/319,723, filed on Mar. 14, 2022.

Additionally, the present application is a continuation-in-part under 35 U.S.C. § 120 of U.S. patent application Ser. No. 17/890,812, filed on Aug. 18, 2022, which claims the benefit under 35 U.S.C. § 119(e) of U.S. Provisional Patent Application No. 63/319,723, filed on Mar. 14, 2022.

All of the applications identified above are incorporated herein by reference.

BACKGROUND

Existing capsule-based coffee machines extract coffee from coffee grounds that are pre-packaged in a capsule (or "pod") with only one or a few fixed brewing settings/options. These brewing options cannot be adjusted or optimized for the particular coffee grounds used. Therefore, their ability to extract the flavors of many different coffee varieties to the full extent is limited. This limitation, combined with the lack of freshness in pre-ground coffee, has contributed to a large difference in quality between a black coffee served in a boutique café and one prepared by a conventional capsule-based coffee machine. For example, in a boutique café, a barista often perfects the cup of coffee with their understanding of the coffee beans and a unique choice of extraction parameters, including grind size, water temperature, coffee-to-water ratio, pouring methods, etc. Therefore, there is no easy, affordable and convenient solution on the market that enables the complete customization of brewing recipes and produces café-quality black coffee at home. It is now recognized that a need exists for a capsule-based brewer capable of providing customized brewing recipes to produce high quality brewed beverages, such as coffee, in any environment where a high-quality beverage is desired.

SUMMARY

The present disclosure is directed to a single-serving beverage brewing system that includes an electronic reader to read an identification tag that may correspond to a brewing recipe, a grinder to grind a brewing agent (e.g., coffee beans) into ground powder (e.g., coffee grounds) with adjustable coarseness, a capsule dock to move the ground powders in a pod or a reusable dripper, a brewer to dispense water for brewing the single-serving beverage from the ground powders, and a pod or a useable dripper to hold the ground powder during the extraction process. This system is designed to provide a convenient and efficient way of brewing coffee.

Particular embodiments are directed to an automatically adjustable coffee grinder that includes a main motor configured to provide and output a rotational movement, a main gearbox configured to output a rotational movement to be coupled with the movement output from the main motor, a main shaft configured to transfer the coupled movement output by the main motor and the main gearbox, and a burr assembly configured to receive the coupled movement through the main shaft. The coffee grinder is configured to automatically grind and make powders of coffee beans with adjustable grind sizes. The main gearbox includes a stepper motor, a plurality of gears, and a secondary shaft that connects the stepper motor and the gears. The burr assembly comprises an inner burr that rotates along the axial of the main shaft and an outer burr that is stationary and encases the inner burr. The inner burr has a conical shape, and the burr assembly is made of stainless steel treated with nitriding. To adjust the grind size, the inner burr is configured to move upwards or downwards together with the main shaft resulting in an adjustment of the gap between the inner burr and the outer burr, and any stray particles that escape during the grinding process are collected by a magnetic tunnel situated below the outer burr.

Particular embodiments are directed to a coffee brewing system, comprising: a grinder configured for grinding whole coffee beans into coffee grounds with adjustable coarseness, wherein the grinder is configured to receive the whole coffee beans through a first opening above the grinder and dispense the coffee grounds through a second opening below the grinder; a brewer configured to dispense water for brewing coffee through a third opening below the brewer, wherein the brewer is positioned laterally relative to the grinder; a capsule dock configured to (a) hold a capsule containing a coffee filter and (b) translate the capsule from a first position under the second opening of the grinder to a second position under the third opening below the brewer; and a controller configured to control the grinder, brewer, and capsule dock. In particular embodiments, the capsule dock comprises a haptic sensor, and the controller is configured to initiate a brewing process when the haptic sensor of the capsule dock senses a touch event. In particular embodiments, the coffee brewing system comprises an electronic reader configured to read an identification tag on the capsule, wherein the controller is further configured to adjust one or more settings of at least one of the grinder or the brewer based on information associated with the identification tag. In particular embodiments, at least one of the one or more settings adjusts a coarseness of coffee ground by the grinder. In particular embodiments, at least one of the one or more settings adjusts a temperature, a volume, or a pouring pattern of water dispensed by the brewer. In particular embodiments, the controller is configured to cause the capsule dock to translate from the first position to the second position based on an indication of a completion of a grinding operation. In particular embodiments, the indication of the completion of the grinding operation is based on a weight measured by a weight sensor of the capsule dock. In particular embodiments, the controller is configured to cause the brewer to start a brewing process based on an indication that the capsule dock is at the second position under the brewer. In particular embodiments, the controller is configured to receive instructions from a user interface configured to allow a user to specify a grind size, a water temperature, a water volume, or a coffee-to-water ratio. In particular embodiments, the controller is configured to receive instructions from a user interface configured to present one or more brewing recipes for user selection, wherein each brewing recipe specifies a predetermining brewing configuration for the coffee brewing system. In particular embodiments, the user interface is presented by an application on a user device separate from the coffee brewing system. In particular embodiments, the controller is configured to receive instructions from a user interface configured to allow a user to specify brewing details associated with a plurality of pours to be used during a brewing process. In particular embodiments, the brewing details associated with each of the plurality of pours comprise a water temperature, a water volume, or a pouring pattern. In particular embodiments, the grinder comprises: a burr assembly comprising an inner burr and an outer burr, wherein the inner burr is connected to a main shaft and rotates along an axis of the main shaft, and the outer burr is positioned and encased around the inner burr; and a motor configured to control a separation between the inner burr and the outer burr. In particular embodiments, the separation between the inner burr and the outer burr affects a coarseness of the coffee ground. In particular embodiments, the controller is configured to cause the inner burr to move upward to decrease the separation between the inner burr and the outer burr to decrease the coarseness of the coffee ground. In particular embodiments, the capsule dock comprises: a capsule holder configured to receive a capsule; a linear positioning stage configured to horizontally translate the capsule holder; and a connecting member connecting the capsule holder and the linear positioning stage. In particular embodiments, the capsule dock is configured to shake during a brewing process. In particular embodiments, the capsule dock comprises an integrated position sensor that is configured to detect whether the capsule is in a correct position for receiving the coffee grounds from the grinder or receiving water from the brewer. In particular embodiments, the brewer comprises electrodes configured to generate an electrical field for bending water dispensed by the brewer.

Particular embodiments are directed to a method for grinding and making powders. The method involves retrieving and setting a desired grind size, starting the main motor and the stepper motor, transferring rotational and linear movements to the burr assembly, driving the inner burr to rotate and move to a predetermined position relative to the outer burr, and grinding the powders with the desired grind size. The inner burr can move linearly upward or downward based on the selected grind size together with the main shaft. The predetermined position is set according to the selected grind size and can be adjusted by controlling the gap between the inner and outer burrs. The position of the inner burr and the gap between the burrs are constantly measured to ensure accurate and precise grinding.

Particular embodiments are directed to a grinder for grinding whole coffee beans into coffee grounds with automatically adjustable coarseness, comprising a burr assembly for grinding whole coffee beans, which comprises an inner burr having a side surface that is slanted and abrasive or serrated, and an outer burr surrounding the inner burr, wherein the side surface of the inner burr and the outer burr define a gap. The grinder further comprises: a main motor configured to provide a first rotational movement to the inner burr; a main shaft having one end attached to the inner burr, wherein the main shaft is configured to transfer the first rotational movement provided by the main motor to the inner burr; a second motor configured to adjust a vertical position of the main shaft and the inner burr relative to the outer burr, wherein changes in the vertical position of the inner burr relative to the outer burr cause changes in the gap between the inner burr and the outer burr; and a controller configured to control the main motor and the second motor. A coarseness of the coffee grounds depends on the gap between the inner burr and the outer burr. In particular embodiments, the second motor is a stepper motor configured to provide a second rotational movement used for adjusting the vertical position of the main shaft and the inner burr. A plurality of gears may be configured to transfer the second rotational movement into a linear movement for adjusting the vertical position of the main shaft and the inner burr. In particular embodiments, the inner burr and the main shaft rotate along an axis of the main shaft. In particular embodiments, the outer burr is stationary and fixed to a housing. In particular embodiments, the burr assembly is configured to receive the whole coffee beans from above and output the coffee grounds through an opening below the burr assembly. In particular embodiments, the inner burr is configured to move downward relative to the outer burr to increase the coarseness of the coffee grounds. In particular embodiments, the inner burr is configured to move upward relative to the outer burr to decrease the coarseness of the coffee grounds. In particular embodiments, the controller is configured to calibrate the grinder by causing the inner burr to return to a zero position where the gap is at a minimum. In particular embodiments, the inner burr has a top surface and a bottom surface, wherein the bottom surface is larger than the top surface. In particular embodiments, the inner burr has a conical shape. In particular embodiments, the controller is configured to automatically adjust the vertical position of the inner burr relative to the outer burr based on a brewing recipe specifying a desired coarseness of the coffee grounds. In particular embodiments, the brewing recipe is selected based on an identification tag associated with a capsule holding the whole coffee beans. In particular embodiments, the controller is configured to automatically adjust the vertical position of the inner burr relative to the outer burr based on an input provided by a user through a user interface. In particular embodiments, the user interface is provided by an application installed on a user device. In particular embodiments, the burr assembly has a layer of nitride compound. In particular embodiments, the controller is configured to cause a capsule dock to be positioned underneath the grinder before initiating a grinding operation, wherein the capsule dock is configured to hold a capsule for catching the coffee grounds output by the grinder. In particular embodiments, the controller is configured to cause the capsule dock to be positioned underneath a water dispenser after a completion of the grinding operations. In particular embodiments, the grinder is integrated within a coffee brewing system. In particular embodiments, the controller is configured to measure an output torque of the main motor to detect whether the gap between the inner burr and the outer burr is at a correct position.

Particular embodiments are directed to an automatic dock configured to hold and translate a pod during the brewing process. It includes a capsule holder, a linear positioning stage that can horizontally translate the pod, and a weight sensor that can measure the weight of the pod. The weight sensor is an integrated force sensor with a strain gauge attached to a compliant structure of the dock, which can measure the degree of deformation of the structure due to the weight of the pod in real-time. The dock system also includes a connecting member that connects the capsule holder and the linear positioning stage. The linear positioning stage contains a stepper motor, a mount to attach it inside the brewer's housing, and an integrated position sensor that can detect the location of the pod on the stage. The stepper motor can provide haptic feedback by shaking the holder and agitating the pod during the brewing process, either at a preset frequency, a preset time, or a preset duration. The front end of the holder can also act as a button or switch to activate the brewing process. In addition, the integrated position sensor can confirm whether the pod is in the correct position for grinding and brewing.

The present disclosure is also directed to a method for controlling a capsule dock including holding and translating a pod holder on a linear positioning stage during a brewing process. A pod is held in the holder, and its position and weight are detected on a linear positioning stage. The pod is then translated horizontally on the stage. The position detection is done using an integrated position sensor, and the weight detection is done using an integrated force sensor with a strain gauge attached to a compliant structure on the stage. Additionally, the method includes shaking and agitating the pod during the brewing process by a stepper motor integrated into the linear positioning stage, either at a preset vibration frequency for a preset amount of time or at a preset time during or after a pour of water. In some embodiments of the present disclosure, the brewing process can be activated by pressing the front end of the holder, which provides haptic feedback driven by a stepper motor of the linear positioning stage.

Particular embodiments are directed to a dock system configured to hold and translate a capsule containing coffee grounds during a brewing process, comprising: a capsule dock configured to receive and hold the capsule; a linear positioning stage configured to translate the capsule dock; a mount configured for mounting the linear positioning stage inside a housing of a coffee brewer; and a controller configured to cause the linear positioning stage (a) to move the capsule dock to a first position underneath a grinder of the coffee brewer before and during a grinding operation and (b) to move the capsule dock to a second position underneath a water dispenser of the coffee brewer before and during a water-dispensing operation. In particular embodiments, the dock system further comprises a connecting member connecting the capsule dock and the linear positioning stage. In particular embodiments, the capsule dock comprises an integrated force sensor. In particular embodiments, the integrated force sensor is configured to measure a weight of the capsule. In particular embodiments, the integrated force sensor is configured to measure the weight of the capsule in real time during at least one of the grinding operation or the water-dispensing operation. In particular embodiments, the weight of the capsule is used by the controller of the coffee brewer to control at least one of the grinding operation or the water-dispensing operation. In particular embodiments, the integrated force sensor is configured to detect force applied on a front end of the capsule dock. In particular embodiments, the controller is configured to initiate a brewing process based on the force applied on the front end of the capsule dock. In particular embodiments, the linear positioning stage includes an integrated position sensor configured to detect a location of the capsule dock on the linear positioning stage. In particular embodiments, the linear positioning stage includes a stepper motor. In particular embodiments, the stepper motor is configured to provide haptic feedback when a force is applied on a font end of the capsule dock. In particular embodiments, the stepper motor is configured to shake the capsule dock, thereby agitating the coffee grounds in the capsule during the water-dispensing operation. In particular embodiments, the stepper motor is configured to shake the capsule dock at a preset vibration frequency during the water-dispensing operation. In particular embodiments, the stepper motor is configured to shake the capsule dock for a preset amount of time during the water-dispensing operation. In particular embodiments, the stepper motor is configured to shake the capsule dock at a preset time during and after a pour of water during the water-dispensing operation. In particular embodiments, the capsule dock comprises a holder with an opening for receiving the capsule. In particular embodiments, the opening is circular and is smaller than at least a portion of a cross section of the capsule. In particular embodiments, the controller is configured to move the capsule dock from the first position to the second position upon a determination that the grinding operation is complete. In particular embodiments, the determination that the grinding operation is complete is based on time. In particular embodiments, the determination that the grinding operation is complete is based on a weight on the capsule dock.

Particular embodiments are directed to a brewer, including: a nozzle configured to dispense a stream of water downward; a holder configured to hold a container for coffee grinds or tea below the nozzle to receive the stream of water; a first electrode disposed adjacent to the stream of water dispensed by the nozzle; a voltage source electrically coupled to the first electrode through an electrical circuit and configured to apply a voltage to the first electrode; and a controller communicatively coupled to the electrical circuit and configured to control a magnitude of the voltage applied to the first electrode from the voltage source, wherein varying the magnitude of the voltage applied to the first electrode generates an electrical field that changes a distance of the stream of water from the first electrode.

Particular embodiments are directed also directed to a method for controlling a water stream output from a brewer, the method including: dispensing the water stream from a nozzle of the brewer into a container for coffee grinds or tea; charging one or more electrodes surrounding the water stream dispensed by the nozzle using one or more electrical circuits coupled between the one or more electrodes and a voltage source; and controlling a magnitude of voltage output to each of the one or more electrodes via a controller based on instructions received at the controller regarding a pouring pattern for the water stream; and generating an electrical field using the one or more charged electrodes to bend the water stream dispensed by the nozzle according to the pouring pattern.

Particular embodiments are directed are also directed to a non-transitory computer-readable medium including instructions to control the pouring of water from a brewer, the instructions when executed by a processor cause the processor to perform a method including: receiving or accessing a pouring pattern indicative of a dynamic pattern in which a stream of water is to be dispensed in different directions relative to a stationary nozzle; determining that a container for coffee grinds or tea is placed under the stationary nozzle and ready to receive the stream of water; causing the stream of water to be dispensed by the stationary nozzle in response to the determination; output control signals to one or more electrical circuits for adjusting a magnitude of a voltage applied to each of a plurality of electrodes surrounding the stream of water while the stream of water is being dispensed, the output control signals being generated based on the pouring pattern.

Particular embodiments are directed to a single-serving coffee pod, including: a hollow capsule having an opening at a first end thereof and at least one smaller opening in a second end thereof opposite the first end; a filter disposed within the capsule; a plurality of whole coffee beans located within the capsule; and a removable covering disposed over the opening of the capsule.

Particular embodiments are directed to a single-serving coffee pod, including: a hollow capsule configured to hold whole coffee beans therein and to receive coffee grounds made from the whole coffee beans; and an identification tag disposed on the capsule, the identification tag configured to be scanned by a reader, wherein the identification tag is configured to provide or trigger access to information upon scanning of the identification tag by the reader, the information corresponding to the whole coffee beans held in the capsule, corresponding to a recipe for brewing coffee from the whole coffee beans in the capsule, or both.

Particular embodiments are directed to a single-serving beverage brewing system including: a brewer including a reader; and a single-serving pod including: a hollow capsule configured to hold a brewing agent therein; and an identification tag disposed on the capsule, wherein the brewer further includes a processor communicatively coupled to the reader, wherein in response to the reader reading the identification tag, the processor is configured to access or retrieve information regarding the brewing agent, a recipe for brewing a beverage from the brewing agent, or both.

DESCRIPTION OF EMBODIMENTS

Figures 1A, 1B:
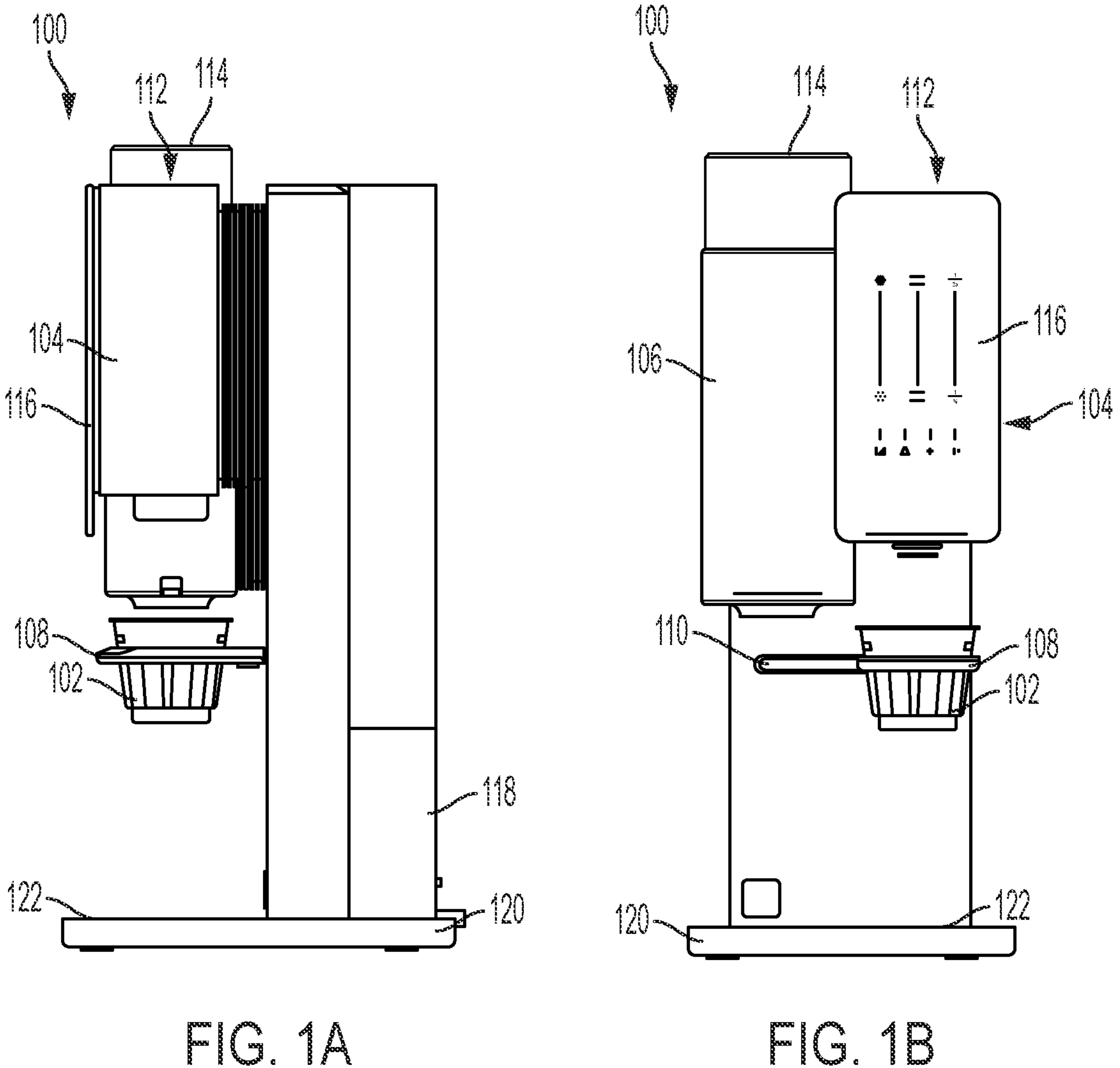
FIGS. 1A and 1B are sides and front views of a single-serving brewing system, in accordance with an embodiment of the present disclosure.

This disclosure describes exemplary beverage brewing systems which may be particularly suitable for brewing a single serving of coffee. The disclosure includes capsule-based brewers and exemplary single-serving coffee pods, and exemplary systems and methods for automatically grinding coffee beans and adjusting the coarseness, controlling a capsule dock during the brewing process, and controlling a water stream output from a brewer.

Single-serving capsule-based beverage brewers (also known as "capsule" or "pod"-based brewers) are becoming commonplace in individual homes to provide single-serving cups of coffee, tea, and other hot beverages. However, existing capsule-based brewers lack the ability to tailor the brewing method to the particular type of coffee, tea, etc. being made therein. Typically, the only adjustment to the brewing method is for selecting a volume of water to be output by the brewer. It is now recognized that a need exists for a capsule-based brewer capable of providing customized brewing recipes to produce high-quality brewed beverages, such as coffee, in a home environment.

This application discloses a new category of capsule-based coffee machines and their enabling technologies. The disclosed product allows several brewing conditions to be set to any combination, giving the roaster or the barista complete control of how the coffee is prepared even without their presence. The conditions may include: grind size, brewing temperature, coffee-to-water ratio, brewing duration, pouring patter, pouring rate, agitation, and/or "blooming." For customers, the process is done by the touch of a button, retaining the convenience of a conventional capsule machine. The machine can recognize the type of beans in the pod and search for the best-matched recipes. The recipe can be created by the roasters who produce the coffee, well-trained barista(s) who have studied and tested the particular type of coffee beans, or coffee drinkers themselves. As such, the disclosed capsule-based brewer functions as an at-home barista. The disclosed brewer enables high-end coffee makers to provide premium coffee drinks (not just beans) to customers to be enjoyed in their peak form without leaving home.

The present disclosure provides a single-serving capsule-based beverage brewing system including a grinder that makes ground powders with adjustable coarseness (e.g., whole coffee beans may be ground to coffee grounds of varying coarseness); a capsule dock configured to hold and translate a capsule filled with the ground powders during the brewing process; and a brewer with a solid-state water pouring mechanism. In particular embodiments, the brewing system may further include electronic readers that read identification tags of the beans, powders, and/or recipes for grinding and brewing, and a controller that controls the overall brewing process based on the information obtained via the identification tag. The brewing system may be configured to work with single-serving coffee pods (which may be interchangeably referred to as pods, coffee capsules, or capsules in this disclosure) that can be used to brew a high-quality single serving of coffee or other hot beverage using a specifically tailored pouring technique applied to a brewing agent in the pod. The single-serving coffee pods may initially contain whole coffee beans, thus providing whole beans to the brewer for grinding immediately prior to the brewing process. Each single-serving coffee pod may include an identification tag that can be read by the brewer and used to control the grinding/brewing process. For example, the identification tag may provide information regarding a type of brewing agent that is held in the pod and/or a recipe for grinding/brewing the brewing agent held in the pod to produce an ideal single-serving beverage for that particular brewing agent. In some embodiments of the present disclosure, the pod can be replaced with a reusable dripper that may be optionally tagged with a built-in recipe that allows the user to change or customize the recipe's settings through software. In nonlimiting embodiments, the reusable dripper is made of food-grade biodegradable plastic materials that have low thermal conductivity.

The present disclosure also provides associated methods for grinding coffee beans and making powders with adjustable sizes. The grind size can be determined by adjusting a gap or separation between an inner burr and an outer burr of a burr assembly of the grinder. The gap is determined by controlling the movement of the inner burr upwards or downwards along the axial of the main shaft. The method involves a controller retrieving and setting a desired grind size, starting the main motor and the stepper motor, transferring rotational and linear movements to the burr assembly, driving the inner burr to rotate and move to a desired position relative to the outer burr, and grinding the powders with the desired grind size or coarseness. The inner burr can move linearly upward or downward together with the main shaft based on the selected grind size. The position of the inner burr, which affects the coarseness of the resulting coffee grounds, may be set according to the desired grind size and can be adjusted by controlling the gap between the inner and outer burrs. The position of the inner burr and the gap between the burrs are constantly measured to ensure accurate and precise grinding.

The present disclosure also provides associated methods for controlling a capsule dock and translating the capsule dock on a linear positioning stage during a brewing process. At the start of the process, the linear positioning stage positions the capsule dock at a first position underneath the grinder to catch the ground brewing agent (e.g., coffee grounds). A capsule is held by a holder of the capsule dock, and its position and weight may be detected on a linear positioning stage. During a grinding operation, the grinder may grind whole coffee beans poured into an opening of the system, and the resulting coffee grounds may fall through another opening on the bottom of the grinder and into the capsule held by the capsule dock. A controller may determine that the grinding operation is complete, which may be based on a grinding duration, sound, vibration, or weight of coffee sensed by the capsule dock. Upon a determination that the grinding operation is complete, the capsule is then translated on the stage (e.g., horizontally across). The capsule dock would position the capsule underneath the brewer to receive water dispensed by the brewer. The position detection may be controlled using an integrated position sensor, and the weight detection may be achieved using an integrated force sensor with a strain gauge attached to a compliant structure on the stage. Additionally, the automated brewing process may further include shaking and agitating the pod during the brewing process by a stepper motor integrated into the linear positioning stage, either at a preset vibration frequency for a preset amount of time or at a preset time during or after a pour of water. In some embodiments of the present disclosure, the brewing process can be activated by pressing the front end of the holder, which provides haptic feedback driven by a stepper motor of the linear positioning stage.

The present disclosure also provides associated methods for pouring water therefrom that can be used to output water from the brewer according to a specific pouring pattern onto grinds that are held in the capsule below the water output portion of the brewer. The different types of pouring patterns may be tailored to the type of coffee beans being used, similar to how a barista at a cafe pours hot water in a specific pattern to make a pour-over style cup of coffee. The brewer of the present disclosure uses one or more electrodes positioned near an output nozzle of the brewer to bend the water stream in a desired direction(s) for creating the pouring pattern, in response to controlling an applied voltage to each of the electrode(s).

Brewer Overview

Turning now to the drawings, FIGS. 1A and 1B depict an example brewing system 100 in accordance with an embodiment of the present disclosure. The brewing system 100 is a capsule-based brewer configured to brew a single serving of coffee, tea, or some other beverage at a time via interaction with a single-serving pod 102. As described in greater detail below, pod 102 acts as both a container from which a brewing agent (e.g., coffee beans, tea materials, etc.) is provided to the brewing system 100 and as a dripper through which hot water output from the brewer is received to contact and extract flavor from the brewing agent in the pod 102. The term "tea" may refer both to teas made from traditional tea leaves as well as other blends of herbs, tisanes, etc. The term "tea materials" may refer to tea leaves, herbs, spices, flowers, dried fruits, or any other materials from which tea or tisane may be brewed.

In some embodiments, pod 102 may hold whole coffee beans, as opposed to coffee grounds. Providing whole coffee beans in pod 102 improves the freshness of the coffee being brewed since the coffee beans are not ground until immediately before brewing the cup of coffee. Similarly, pod 102 may hold larger pieces of other brewing agents (e.g., whole tea materials) as opposed to pre-ground brewing agents. Pod 102 may include extraction features in the form of indentations or grooves formed in an outer or bottom wall of pod 102. The pod 102 also includes an identification tag (e.g., an RFID tag, 2D barcode, etc.), which stores information about the brewing agents and brewing methods. In addition, pod 102 may include a lid or other removable covering that can be pulled off when it is time to brew a beverage from pod 102.

The brewing system 100 may include, among other things, a brewer (a water dispenser) 104, a grinder 106, a capsule dock 108, a linear positioning stage 110, and an electronic reader 112. As discussed in detail below, the water dispenser 104 may be a solid-state controllable water dispenser able to output water therefrom according to pouring patterns that may be either automatically retrieved for the particular pod 102 or user selected. The water dispenser 104 may include a nozzle configured to dispense a stream of water downward and one or more electrodes configured to bend the water stream based on their charge to create the desired pouring pattern.

The grinder 106 may include a burr grinder, a burr assembly, or any other desired type of grinder suitable for grinding coffee beans, tea materials, and so forth. The grinder 106 may be an adjustable grinder capable of adjusting the grind size of the material output from the grinder 106. The grinder 106 may automatically reset and adjust to a desired grind size in response to receiving a command from a controller in the brewing system 100.

The capsule dock 108 may be configured to hold pod 102. The capsule dock 108 may be configured to hold an empty pod 102 beneath the grinder 106 to receive coffee grounds or tea of a desired size into pod 102 prior to brewing a beverage. Similarly, capsule dock 108 may be configured to hold pod 102 of coffee grounds or tea below the nozzle of the water dispenser 104 to receive the stream of water into pod 102. A relative position of the capsule dock 108 with respect to the rest of the brewing system 100 may be adjusted via the linear positioning stage 110. The linear positioning stage 110 may move the capsule dock 108 between a first location beneath the grinder 106 and a second location beneath the water dispenser 104.

The brewing system 100 may be equipped with an electronic reader 112 (e.g., an RFID reader, barcode scanner, etc.) to interrogate the identification tag on pod 102. As illustrated, reader 112 of the brewing system 100 may be located proximate to an opening 114 of the grinder 106 through which whole beans are input into the grinder 106 prior to beginning the grinding/brewing process. That way, the brewing system 100 may automatically read the identification tag on each pod 102 prior to beginning the grinding/brewing process. It should be noted, however, that reader 112 may be located at any other position on the brewing system 100. For example, in another embodiment, the reader 112 may be located beneath the grinder 106, for example, near the capsule dock 108. As such, the interrogation may occur as soon as a pod 102 is loaded on the capsule dock 108. With the reader 112 in either of these locations, the users may not need to scan the pod 102 directly.

The brewing system 100 may include a user interface 116 through which a user may view information regarding the brewing agent/brewing process associated with the pod 102 and/or input information regarding the brewing process. The user interface 116 may include a display. In an example, as shown in FIG. 1B, the user interface 116 may include a light-emitting diode (LED) panel. In other embodiments, the user interface 116 may include a touchscreen display through which information may be selected or input via the user interacting with the touchscreen. Additionally or alternatively, the user may make selections using buttons, dials, etc. on the brewing system 100 and/or by pressing the capsule dock 108 at a certain location. In some embodiments, the brewing system 100 may not include a user interface. The brewing system 100 may instead be communicatively coupled to a user's personal device (e.g., cell phone) to receive inputs and/or output information regarding the brewing process to the user.

The brewing system 100 may include a combination of the water dispenser 104, grinder 106, capsule dock 108, linear positioning stage 110, reader 112, opening 114, and user interface 116 located within, or coupled to, a main housing 118 of the brewing system 100. The main housing 118 may be supported on a base 120, as shown. In some embodiments, the base 120 may include a cup holder 122 on which a cup is to be placed to ultimately receive the brewed beverage output through the pod 102 (acting as a dripper) under the water dispenser 104. In some embodiments, the dripper can be a reusable dripper tagged with a built-in recipe that allows the user to change or customize the recipe's settings through software. In nonlimiting embodiments, the reusable dripper is made of food-grade biodegradable plastic materials that have low thermal conductivity.

The brewing system 100 may operate as follows. Although the following description discusses the use of the brewing system 100 to brew a cup of coffee from pod 102, it should be understood that similar steps may be performed in brewing a cup of tea, hot chocolate, cider, or any other hot beverage prepared using a brewing agent.

First, a user removes the pod 102 from its packaging. The pod 102 may contain whole coffee beans, a built-in filter, an identification tag, and certain extraction features of a coffee dripper. The user may remove the lid or other covering from the top of the pod 102 and then empty the coffee beans from the pod 102 through the opening 114 into the grinder 106. The user may then place the empty pod 102 on the capsule dock 108. The empty pod 102 will serve as the filter and dripper once the brewing process begins.

During this process, the reader 112 of the brewing system 100 may read the identification tag on the pod 102. The reader 112 detects the type of coffee from the identification tag on the pod 102 and retrieves the best recipe for the coffee beans that were packaged in the pod 102. The brewing recipe may include brewing water temperature, water volume, flow rate, grind size, pouring pattern, brewing duration, coffee-to-water ratio, etc. The brewing system 100 may be turned on or "woken up" upon the reader 112 detecting the presence of the identification tag on the pod 102 and/or reading the identification tag.

The brewing system 100 may detect the proper loading of the pod 102 onto the capsule dock 108 via a force sensor incorporated in the capsule dock 108. In some embodiments, a user may press down on a portion of the capsule dock 108 to initiate the grinding/brewing process. Upon detecting the proper loading of the pod 102 and/or the user pressing down on the capsule dock 108, the linear positioning stage 110 automatically moves the pod 102 to be underneath the grinder 106 to receive coffee grounds output from the grinder 106.

The grinder 106 automatically adjusts its coarseness/grind size based on the recipe or user preferences. The grinder 106 may automatically recalibrate and set to zero to maintain the accuracy of grind size between subsequent grinding/brewing operations. The coffee grounds fall into the pod 102 held by the capsule dock 108. The integrated force sensor of the capsule dock 108 may measure the exact amount of coffee to be extracted.

Upon completion of grinding, the linear positioning stage 110 then automatically moves the capsule dock 108 with the pod 102, which now contains coffee grounds, to be underneath the water dispenser 104. The water dispenser 104 automatically adjusts the water temperature, flow rate, pouring pattern, and coffee-to-water ratio, based on the detected recipe and/or user preferences. The water dispenser 104 dispenses a water stream from a nozzle of the brewing system 100 into the pod 102 holding the coffee grounds. The force sensor on the capsule dock 108, combined with a water flow sensor, monitors the real-time coffee-to-water ratio inside the pod 102 to gain additional control over the brewing process as well as to prevent overflow. The water dispensed into the pod 102 extracts flavor and color from the coffee grounds and is filtered through the pod 102. Coffee exits one or more openings in the bottom of the pod 102 and falls into a cup below.

Figure 2:
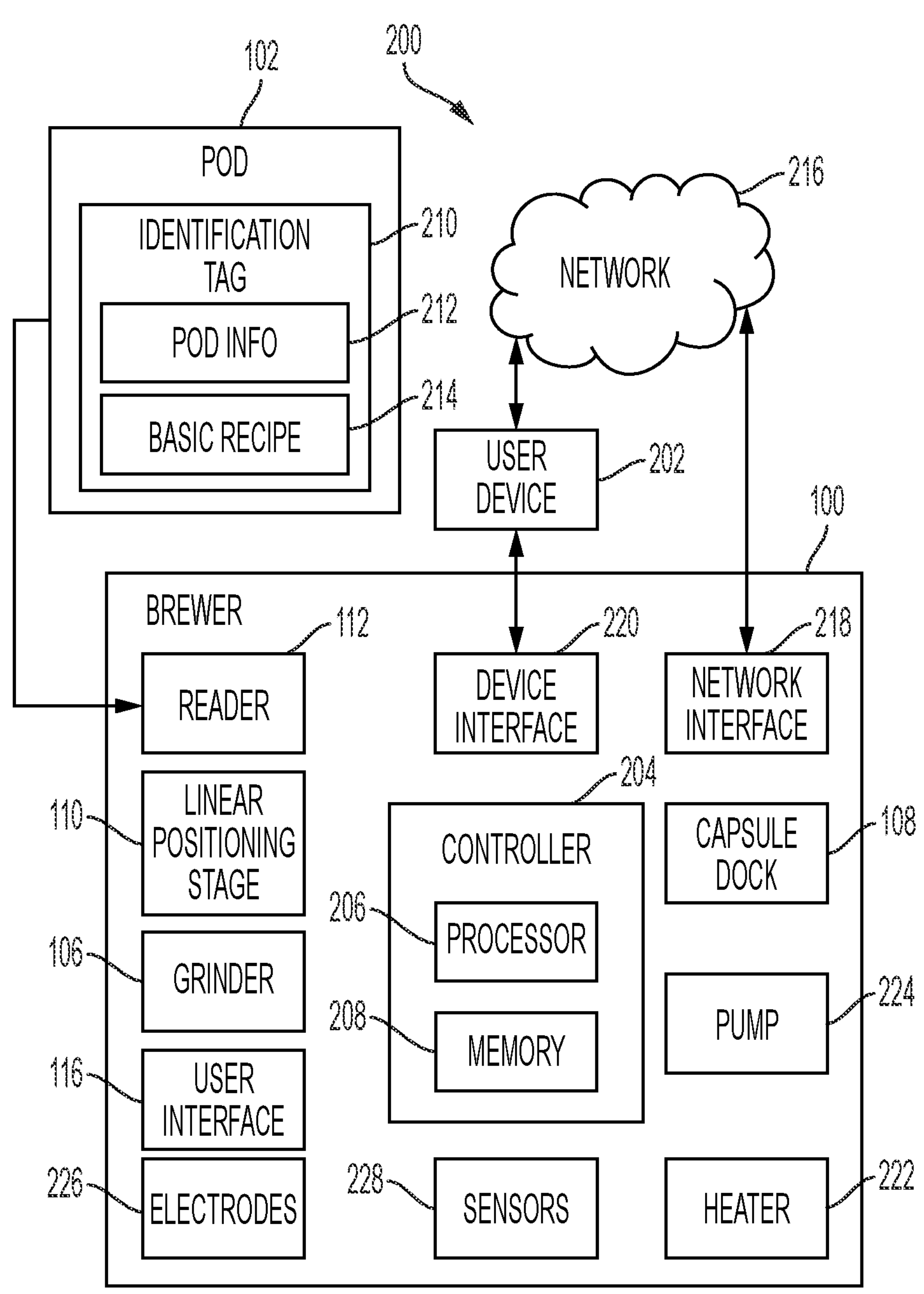
FIG. 2 is a schematic diagram of a system for brewing beverages, in accordance with an embodiment of the present disclosure.

FIG. 2 depicts a system 200 for brewing beverages including a brewing system 100 as described above. The system 200 of FIG. 2 illustrates a number of electrical components and communication interfaces that may interact within the brewing system 100 and between the brewing system 100, the pod 102, and/or a separate user device 202 to control the grinding/brewing process.

The system 200 may be a single-serving beverage brewing system including the brewing system 100 and a single-serving pod 102. The brewing system 100 comprises the reader 112. The pod 102 may include a hollow capsule configured to hold a brewing agent therein, and an identification tag 210 disposed on the capsule. The brewing system 100 may further include a controller 204 comprising one or more processors 206 and memory 208. The memory 208 may store instructions that when executed by the one or more processors 206 determine a brewing recipe for the pod 102, control a grinding/brewing process, and/or cause the controller 204 to perform one or more methods disclosed herein. For example, in response to the reader 112 reading the identification tag 210, the processor(s) 206 may access or retrieve information regarding: the brewing agent, a recipe for brewing a beverage from the brewing agent, or both. As such, the controller 204 may be configured to determine a brewing recipe for the pod 102 and control the brewing process according to the brewing recipe.

The brewing recipe may be determined at least in part based on information retrieved by the electronic reader 112. The reader 112 may scan and/or interrogate the identification tag 210 located on the pod 102 when the pod 102 is brought near a certain location of the brewing system 100. The identification tag 210 may include information stored thereon (e.g., in a chip, barcode, etc.). The information stored on the identification tag 210 may include pod information 212 regarding the contents of the pod 102 (e.g., information about coffee beans located in the pod 102). The pod information 212 may include one or more of the following: type of coffee bean, name of the roaster, type of roaster, roast date, and flavor notes. The information stored on the identification tag 210 may also include basic recipe information 214 regarding one or more appropriate (or preferred) recipes for brewing a beverage from the contents of the pod 102. The recipe information 214 may include one or more of the following parameters for brewing a beverage: grind size, water temperature, water to coffee ratio, flow rate, and pouring pattern.

In some embodiments, the identification tag 210 on the pod 102 may not be capable of containing all information associated with the pod and/or the brewing recipe. In such instances, the identification tag 210 may include data including an address or link to the information stored in an external network 216. This additional information may include any of the above-referenced types of pod information 212, recipe information 214, and/or rich media content including pictures, videos, recommendations, etc. The brewing system 100 may include a network interface 218 for retrieving the additional information from the external network 216 based on the link read from the identification tag 210. In some embodiments, the identification tag 210 may simply be a bar code or quick response (QR) code that includes a stock keeping unit (SKU) or link used to access information regarding the pod and/or brewing recipe stored in an external network 216.

The brewing system 100 may also include pod information and/or recipe information stored in the memory 208 of the controller 204. In some embodiments, the brewing system 100 may access pod and/or recipe information from the memory 208 based on a link or SKU read from the identification tag 210. The brewing system 100 may include a number of different pre-set brewing recipes stored in the memory 208, with each SKU being linked to one or more of the pre-set brewing recipes. Upon detecting the identification tag 210, the processor 206 may check the network interface 218 to determine whether the brewing system 100 is connected to an external network 216. If the brewing system 100 is not connected to the external network 216, the processor 206 may select one or more of the pre-set brewing recipes from memory 208 based on the information read from the identification tag 210. If the brewing system 100 is connected to the external network 216, the processor 206 may retrieve one or more brewing recipes from the external network 216 via the network interface 218 based on the information read from the identification tag 210. The recipes and other information stored in both the external network 216 and the on-board memory 208 may be updated periodically, such as when a manufacturer, partner, barista, or user uploads new recipes to the external network 216 for a particular pod.

The system 200 may enable a user to make selections of or updates to the brewing recipe(s) that are determined based on information read from the identification tag 210 on a pod 102. In some embodiments, the brewing system 100 may include an on-board user interface 116 having one or more input/output devices for making a selection or an update. For example, the user interface 116 may include a display, a touchscreen, one or more buttons or dials, a keyboard, and/or any other input/output devices that allow a user selection or input to be made to the brewing system 100. The user interface 116 may enable a user to make selections of a brewing recipe and/or update one of the presented brewing recipes. Once a selection is made, the user interface 116 may communicate the selection to the controller 204 for implementation.

In some embodiments, the brewing system 100 may include a device interface 220 configured to communicatively couple the controller 204 to a user device 202 (e.g., a cell phone) via WIFI, Bluetooth, or any other wired or wireless connection. The device interface 220 may communicate information from the reader 112 to the user device 202, and the user device 202 may be equipped with an application configured to receive the information from the reader 112 and present one or more brewing recipes to a user. The user device 202 may enable a user to make selections of a brewing recipe and/or update one of the presented brewing recipes. Once a selection is made, the device interface 220 may communicate the selection from the user device 202 to the controller 204 for implementation.

The system 200 may enable a user to design an entirely new brewing recipe for a particular SKU from scratch. The user interface 116 and/or an application on the user device 202 may present the user with multiple brewing recipe parameters that may be added, selected, adjusted, and/or removed to create a new brewing recipe. The controller 204 may access the new brewing recipe and control various components of the brewing system 100 to execute the grinding/brewing operations of the recipe. The user-created recipe may be stored directly in the memory 208 of the brewing system 100. The user-created recipe may be uploaded and stored in the external network 216 via the network interface 218 and/or the user device 202.

Determining the brewing recipe may include accessing the information stored on the identification tag 210 via the reader 112, and retrieving the brewing recipe directly from information stored on the identification tag 210 or from the external network 216. Determining the brewing recipe may include accessing the information stored on the identification tag 210 via the reader 112, presenting one or more brewing recipes to a user via the user interface 116 and/or a user device 202, obtaining user input(s) regarding the one or more brewing recipes presented, and outputting a brewing recipe selected and/or updated by the user. Determining the brewing recipe may include enabling a user to create a new brewing recipe via the user interface 116 and/or a user device 202.

Upon determining the brewing recipe, the controller 204 may control the brewing system 100 to brew a beverage according to the determined brewing recipe. Controlling the brewing process may include controlling: the capsule dock 108, the linear positioning stage 110, the grinder 106, and/or the water dispenser (e.g., 104 of FIG. 1). Controlling the capsule dock 108 may include providing haptic feedback to a user through the capsule dock 108. Controlling the linear positioning stage 110 may include moving the capsule dock 108 from a first position beneath the grinder to a second position beneath the water dispenser, and/or imparting vibrations to the capsule dock 108 if agitation is required for the brewing recipe. Controlling the grinder 106 may include controlling the grind size for the coffee or other materials placed in the grinder 106.

Controlling the water dispenser (e.g., 104 of FIG. 1) may include controlling one or more of: a water heater 222, a pump 224, and one or more electrodes 226 proximate a nozzle of the water dispenser. Controlling the heater 222 may include heating the water via the heater 222 to a desired brewing temperature. Controlling the pump 224 may include operating the pump to output water from the nozzle at a desired flow rate. Controlling the one or more electrodes 226 may include controlling one or more electrical circuits to adjust the magnitude of a voltage applied to each electrode surrounding the stream of water output from the nozzle.

In addition to the components discussed above, the brewing system 100 may further include one or more sensors 228 configured to provide real-time or near-real-time feedback regarding the grinding/brewing process being controlled by the controller 204. The controller 204 may receive feedback from the sensor(s) 228 and adjust the grinding/brewing operations of the brewing system 100 in response to sensor feedback. The sensor(s) 228 may include, for example, a force sensor on the capsule dock 108, temperature and flow rate sensors in the water dispenser, and so forth.

User Interface

Figures 3A, 3B:
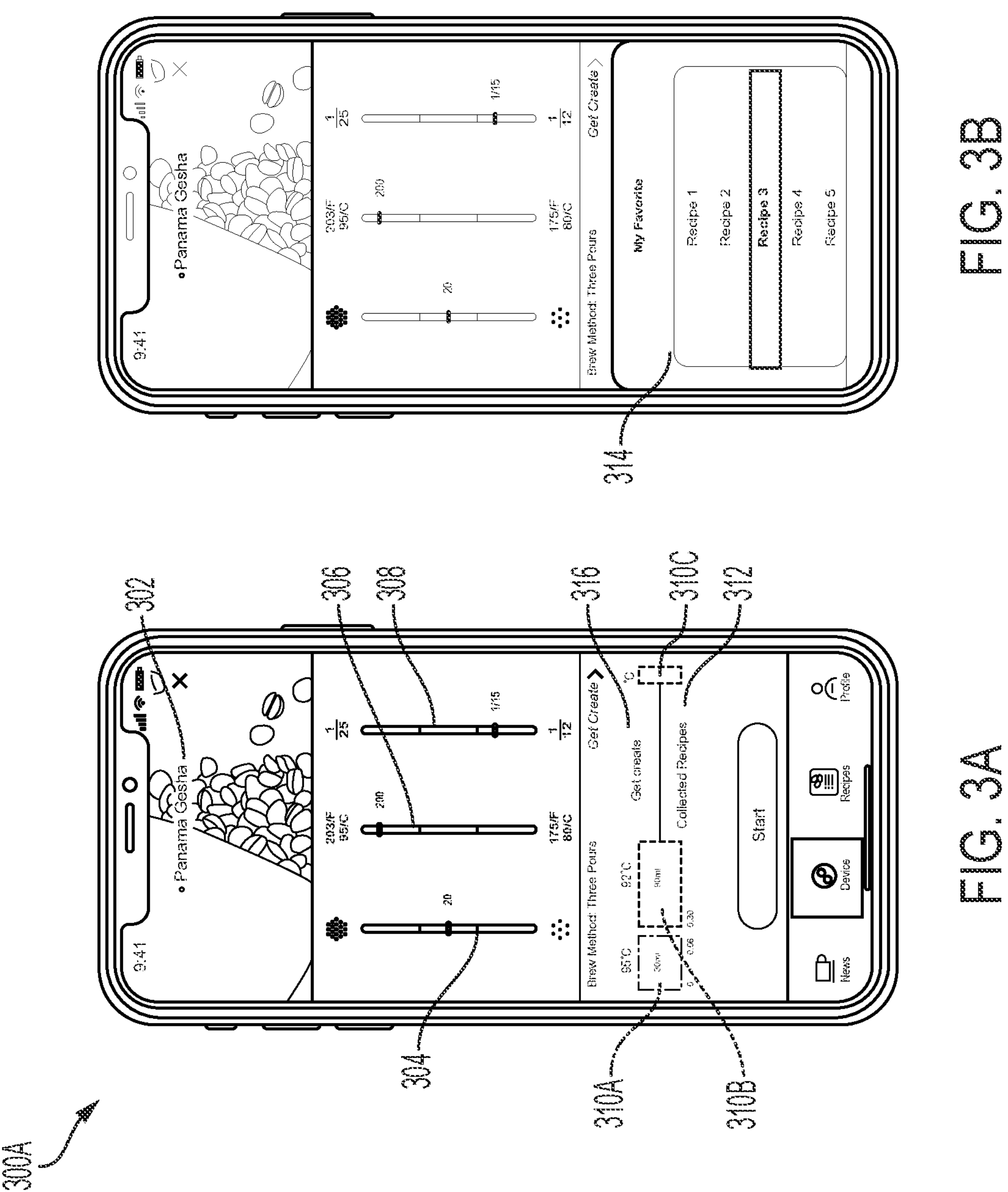
FIGS. 3A-3C depict an example user interface for use with a brewer, in accordance with an embodiment of the present disclosure.
Figure 3C:
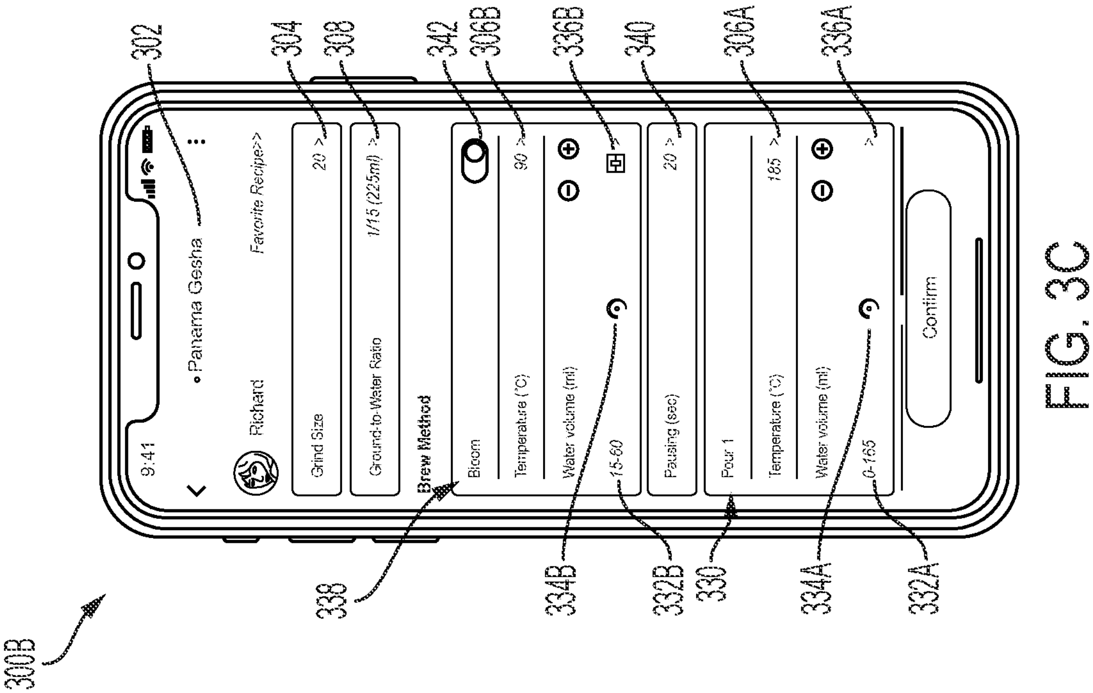

FIGS. 3A-3C depict an example user interface for use with the disclosed brewer. Although shown as an interface of an application on a user device (e.g., cell phone), the user interface may be similarly displayed on a user interface (e.g., 116 of FIG. 2) of the brewer. The interface may enable a user to 1) create a new brewing recipe from scratch, or 2) select and/or adjust an existing brewing recipe retrieved from on-board memory or external storage.

A first page 300A of the user interface includes pod information 302, for example, in the form of a name of the coffee beans in the pod ("Panama Gesha") as read from an identification tag on the pod. The first page 300A may also include a "default" recipe for the pod, as determined based on the recipe information associated with the pod. The "default" recipe may be a brewing recipe that is designed by the manufacturer of the pod, the most popular or highest-rated recipe available from a network database for the pod, or a preferred recipe previously selected for this pod by the user. The "default" recipe may show a number of primary parameters of the brewing recipe including, for example, grind size 304, water temperature 306, and coffee-to-water ratio 308. In other embodiments, different combinations of brewing parameters may be considered primary parameters. The first page 300A may be set up to allow a user to view and/or make changes to the primary parameters of the "default" recipe. For example, in FIG. 3A the grind size 304, water temperature 306, and coffee-to-water ratio 308 are each illustrated via slide bars, which may be adjusted by the user to create a new recipe.

The "default" recipe may include a particular number of pours 310, with each pour 310 having its own set of primary parameters. For example, FIG. 3A illustrates a first page 300A showing the primary parameters for a first pour 310A of three pours 310A-C of the brewing recipe. A user may view or make changes to the primary parameters for any of the other pours 310B or 310C by selecting the pours toward the bottom of the screen.

A user may start from the "default" recipe, as shown, or select another collected recipe 312, for example, by clicking a button. The collected recipes button 312 may provide a list of previously collected recipes ("Favorites") 314 to choose from, as shown in FIG. 3B. These collected recipes may be ones that a user had previously created and entered into their favorites, popular recipes for the pod retrieved from an online database, or a combination thereof. The user may simply select one of the collected recipes in order to choose the brewing recipe. In other instances, if the user is interested in changing parameters to tailor the taste of the coffee to their preferences, the user may adjust the primary parameters from the selected recipe to design a new brewing recipe. The new brewing recipe may then be saved to the user's collected recipes.

If the user wants complete freedom in designing the brewing recipe, the user may select a button 316 on the first screen for creating a new recipe for the pod. This allows the user to adjust not only the primary parameters of the brewing process, but also secondary parameters. FIG. 3C illustrates a second page 300B showing the more detailed list of parameters that may be adjusted by a user. The second page 300B of the user interface includes the same pod information 302 as the first page, and the same primary parameters (e.g., grind size 304, water temperature 306, and coffee-to-water ratio 308) and their values as on the first page.

In addition, the second page 300B of the user interface includes other secondary parameters that may be selected or adjusted for a plurality of pours 330. The number of pours 330 that may be selected for the brewing method may be up to 5 pours, up to 10 pours, or more. For each pour 330 (e.g., "Pour 1"), the secondary parameters may include, for example, a volume 332A, a pouring pattern 334A, and agitation 336A. In addition, a user may select the brewing method to include a "bloom" pour 338 (e.g., prior to the first pour 330) with secondary parameters including a volume 332B, a pouring pattern 334B, agitation 336B, and a bloom duration 340. In other embodiments, different combinations of brewing parameters may be considered secondary parameters for the different pours.

A bloom pour 338 may be added by toggling a switch 342 on the user interface, which allows the user to tailor the bloom pour 338 as desired. A bloom pour 338 allows for carbon dioxide to release from the coffee grounds before beginning potentially larger pours of the brewing process. Coffee grounds often include a certain amount of $CO_2$ trapped inside, and once in contact with water, the $CO_2$ tries to escape, expanding the serving of coffee grounds. Baristas will often give the coffee a time to "bloom," that is giving the $CO_2$ time to escape so that the $CO_2$ does not prevent water from touching the coffee grounds during subsequent pours. The second page 300B of the user interface allows a user to add a bloom pour 338, choose the volume 332B, pouring pattern 334B, and agitation 336B of the bloom pour 338, and to specify a length of time (bloom duration 340) for the coffee grounds to "bloom" before the next pour 330.

Secondary parameters of both the bloom pour 338 and subsequent pours 330 can be adjusted by the user. The volume 332A/B may be the volume in milliliters of water that is dispensed during the pour. The pouring pattern 334A/B may be selected from a predetermined group of dynamic patterns in which water might be dispensed into the pod held under the water dispenser. Such dynamic patterns may include a spiral pattern (either an expanding spiral or an inward-moving spiral), a circle, a point (e.g., "center pour"), a straight line, a wave shape, or a zig-zag shape. The dynamic patterns may also indicate whether the pour is happening more slowly (e.g., in a laminar flow regime) or quickly (e.g., in a turbulent flow regime). The different pouring patterns may bring out different aspects of the flavor profile of the coffee grounds. A user may select or adjust the pouring pattern for any number of the pours 330, including the bloom pour 338. The agitation 336A/B may be an option to include mechanical agitation of the coffee grounds and water in the pod during the pour. For example, if mechanical agitation is selected (e.g., as shown at 336B for the bloom pour 338), the linear positioning stage may vibrate the capsule dock holding the pod back and forth at a high frequency to agitate the coffee grounds in the pod during the pour. If mechanical agitation is not selected (e.g., as shown at 336A for the first pour 330), the linear positioning stage maintains the capsule dock in a stationary position throughout the pour.

The user interface of FIGS. 3A-3C may provide three levels of interaction that a user may have with setting the brewing method for brewing coffee or another beverage from a pod. If a user wishes to simply select a brew method from a list of favorites associated with the pod, they can do so using, for example, a dropdown list as in FIG. 3B. If a user wishes to adjust the primary parameters of a recommended brew method, they can do so using, for example, the first page 300A in FIG. 3A. If the user wishes to adjust all possible parameters including primary and secondary parameters to create a new brew method, they can do so using, for example, the second page 300B in FIG. 3C. The user interface in FIGS. 3A-3C provides only one example of the types of parameters that may be chosen by a user and a layout for doing so. Other versions of the user interface may enable a user to create, select, or adjust different combinations of parameters of a brewing method to be performed via the brewer.

Single-Serving Pod Overview

Figure 4:
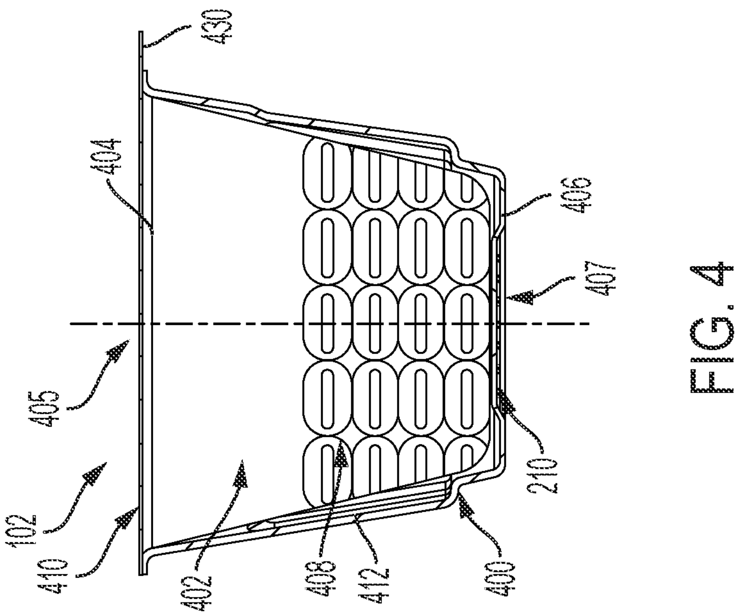
FIG. 4 is a cutaway view of a whole-bean single-serving coffee pod, in accordance with an embodiment of the present disclosure.

FIG. 4 is a detailed cutaway view of the pod 102 that may be used with the brewer of FIGS. 1-2. In FIG. 4, the pod 102 is a single-serving coffee pod. In other embodiments, the pod 102 may be a single-serving pod for other types of beverages that may be brewed using the disclosed brewer. The pod 102 is configured to serve as a holder for a brewing agent, a dripper, and a filter. To that end, the single-serving pod 102 may include a hollow capsule 400 and a filter 402 disposed within the capsule 400. The capsule 400 has an opening 404 at a first end 405 thereof and at least one smaller opening 406 at a second end 407 thereof opposite the first end 405. As illustrated, a plurality of whole coffee beans 408 may be located within the capsule 400. The coffee beans 408 may be located in the filter 402 so that they can be easily poured out of the pod 102 through the opening 404 at the top of the capsule 400. The pod 102 may include a removable covering 410 disposed over the opening 404. The pod 102 may also include the identification tag 210 located on an outside of the capsule 400. In the illustrated embodiment, the identification tag 210 is located on a bottom of the capsule 400. However, the identification tag 210 may be placed at another location of the capsule 400 in other embodiments. The capsule 400 may include multiple structural extraction features 412 (e.g., in the form of protrusions and/or indentations) that help to strengthen the capsule 400 and prevent clogging of the pod 102 during its use as a filter/dripper.

The identification tag 210 may store information (or an address linking to such information) about the coffee beans 408 stored in the pod 102, and/or about a method or recipe for brewing the coffee beans 408 stored in the pod 102. Each pod 102 may have a particular SKU to which information about the coffee beans 408 stored therein and/or brewing recipe(s) for the coffee beans 408 stored therein is linked. The brewing recipe(s) may be specific to achieving an optimal extraction of coffee from the coffee beans 408 for the particular SKU. Each pod/tag may only be used once, and the brewer itself or via connection to an external network may recognize whether the same pod/tag has been used before upon reading the identification tag 210.

Capsule Dock and Linear Positioning Stage

Figure 5A:
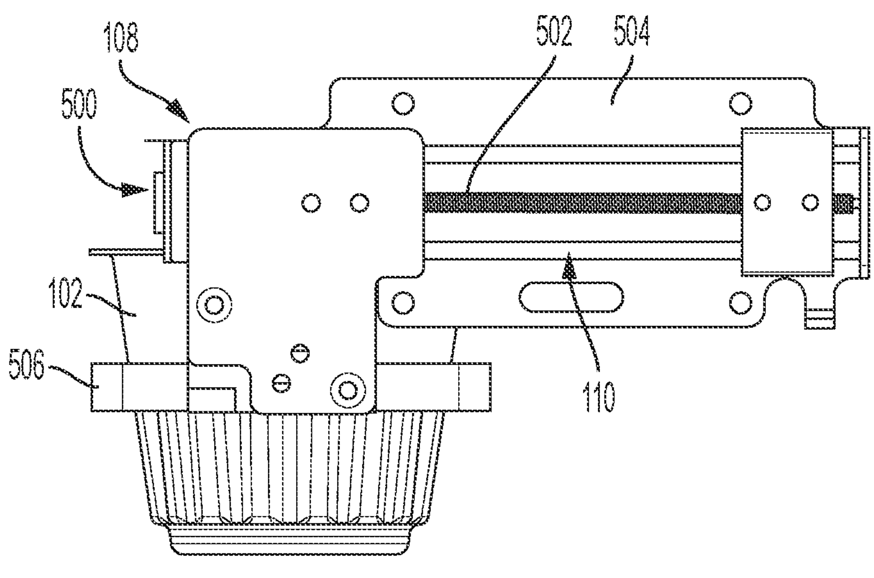
FIGS. 5A-5C depict an example capsule dock and linear positioning stage of a brewer, in accordance with an embodiment of the present disclosure.
Figure 5B:
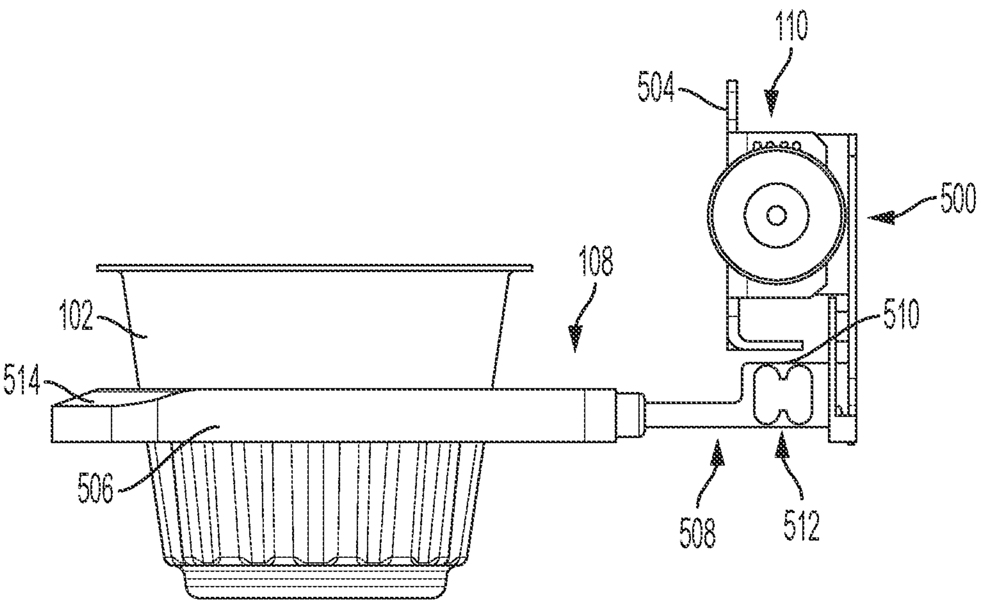
Figure 5C:
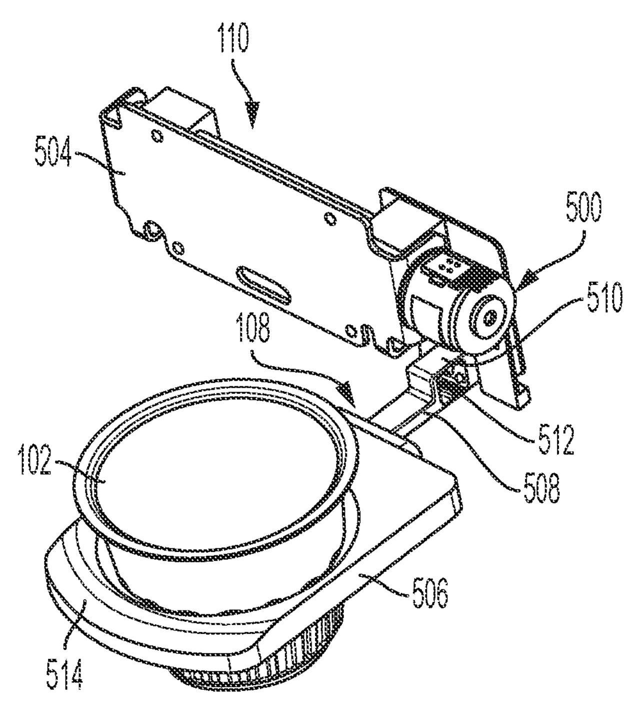

FIGS. 5A-5C depict an example capsule dock 108 and linear positioning stage 110 that may be used in the brewer. In particular embodiments, the capsule dock 108 and linear positioning stage 110 are designed to serve the following purposes: 1) holding the pod 102 in place during brewing; 2) confirming the pod 102 is in the correct position; 3) moving the pod 102 between the grinder and the water dispenser; 4) agitating the coffee/water mixture in the pod 102 during extraction; 5) measuring the weight of the coffee and/or water inside the pod 102; and/or 6) acting as an input button or switch with haptic feedback.

The capsule dock 108 combined with the linear positioning stage 110 form an assembly to bridge the grinder and the water dispenser of the brewer. At the beginning of a brewing process, a controller may cause the capsule dock 108 to first position the pod 102 to a first location/position underneath the grinder 106 to receive coffee grounds. Once the controller determines that the capsule dock 108 is at the proper location for receiving coffee grounds from the grinder, the controller may instruct the grinder to begin grinding. The coffee grounds would fall through a bottom opening of the grinder and into the capsule held by the capsule dock 108. The controller would monitor the grinding process and determine when it is complete. Completion of the grinding process may be determined based on, for example, the amount of coffee grounds in the capsule (measured using a weight sensor), time duration, vibration, sound, or any other suitable means. Once the grinding process completes, the controller may instruct the linear positioning stage 110 to move the capsule dock 108 to a second location underneath the water dispenser 104 to receive water. Once the capsule dock 108 is in the desired position, the controller may initiate the water dispensing process. Water from the water dispenser 104 would pour into the capsule 102 and seep through the coffee grounds to brew coffee.

The linear positioning stage 110 provides a linear translation of the capsule dock 108. The linear positioning stage 110 may include a stepper motor 500 that rotates a threaded guide 502 to provide the linear translation. This provides precise control of the position of the capsule dock 108. The linear positioning stage 110 may also include a mount 504 for mounting the linear positioning stage 110 inside the housing of the brewer. As shown in FIG. 1, the capsule dock 108 may extend to an outside of the housing 118 of the brewing system 100. The linear positioning stage 110 may include an integrated sensor (e.g., position or force sensor) configured to detect the location of the capsule dock 108 with respect to the housing of the brewer. Data collected from this sensor may be used to confirm that the pod 102 is in the correct position for the grinding or brewing operations being performed by the brewer.

In some embodiments, the motor 500 of the linear positioning stage 110 may be controlled to "shake" the capsule dock 108, thereby agitating the contents of the pod 102 held by the capsule dock 108. This vibration may shake the coffee grounds and water to more evenly distribute the mixture of coffee and water in the pod 102 during the brewing process. This may improve the consistency of the extraction, as desired for brewing certain types of coffee. In addition, the motor 500 may be controlled to provide agitation at a specific vibrational frequency, for a specific amount of time, and/or only during or after particular pours during the brewing process. Providing agitation control through the linear positioning stage 110 allows the brewer to execute specifically tailored brewing methods.

The capsule dock 108 may include a capsule holder 506 configured to receive the pod 102 therein. As illustrated, the capsule holder 506 may include a circular opening formed therein for gripping an outer surface of a frustoconical shaped pod 102. In other embodiments, the capsule holder 506 may take other forms. The capsule dock 108 may also include a connecting member 508 connecting the capsule holder 506 to the linear positioning stage 110. The linear positioning stage 110 may be controlled to move the connecting member 508 and capsule holder 506 with respect to the housing of the brewer. The connecting member 508, as shown, may be cantilevered from the linear positioning stage 110.

The capsule dock 108 may further include an integrated force sensor 510. The integrated force sensor 510 may be a strain gauge attached to a compliant structure 512 of the capsule dock 108. For example, as shown in FIGS. 5B and 5C, the integrated force sensor 510 may be a strain gauge attached to a compliant structure 512 of the connecting member 508. When a force (e.g., the weight of the pod 102 or a user's click force) is applied to the capsule holder 506, the compliant structure 512 will deform slightly by the weight, and the strain gauge (e.g., 510) will measure the degree of deformation and calculate the applied force.

The integrated force sensor 510 may enable precision brewing. Based on information received from the force sensor 510, a controller of the brewer may know the exact amount of coffee grounds deposited into the pod 102 and the exact amount of water in the pod 102 throughout the extraction process. This information allows the system to realize unprecedented precision brewing as the amount of water and coffee grounds is measured precisely in real time.

Besides monitoring the water-to-coffee ratio, the force sensor 510 may also help the system detect any potential faults during use of the brewer. For example, the force sensor 510 may help the brewer detect an incorrect amount of coffee deposition (e.g., excessive beans output from the grinder, excessive grounds retention in the pod, etc.). Upon detecting an incorrect amount of coffee deposition, the controller of the brewer may output a notification (e.g., alert) to a user to check the amount of coffee deposition. In addition, the force sensor 510 may help the system detect a clogging of the pod 102, which may result in a restrained outflow of coffee. Upon detecting a clogged pod 102, the brewer may automatically stop dispensing water into the pod 102. In addition, the brewer may output a notification (e.g., alert) to a user to check on the condition of the pod 102.

The integrated force sensor 510 may enable the capsule dock to act as a button or switch by detecting a force applied directly by a user pressing on a front 514 of the capsule holder 506, thereby allowing the user to interact with the brewer. In an example, the linear positioning stage 110 driven by the stepper motor 500 may provide haptic feedback when the system registers a "click" action from the user pressing the capsule holder 506. One application of this user activated switch may be to activate the brewing process once the pod 102 is correctly installed in the capsule dock 108.

Grinder System

Figure 6:
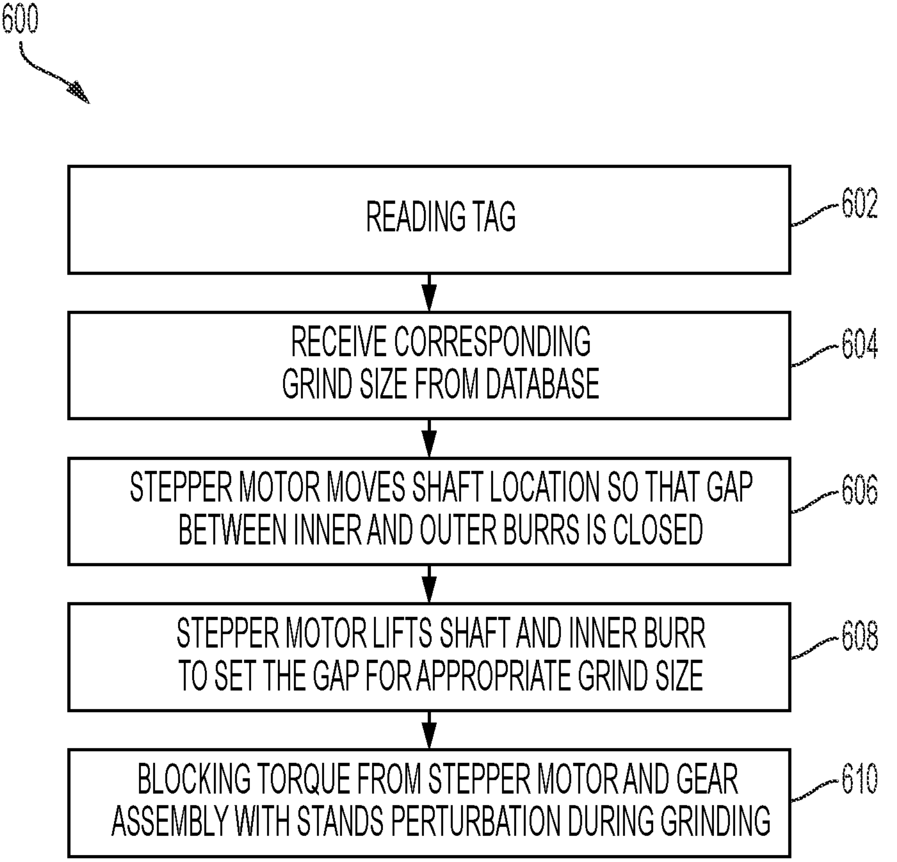
FIG. 6 is a process flow diagram of a method for grinding coffee beans using a brewer, in accordance with an embodiment of the present disclosure.
Figure 7B:
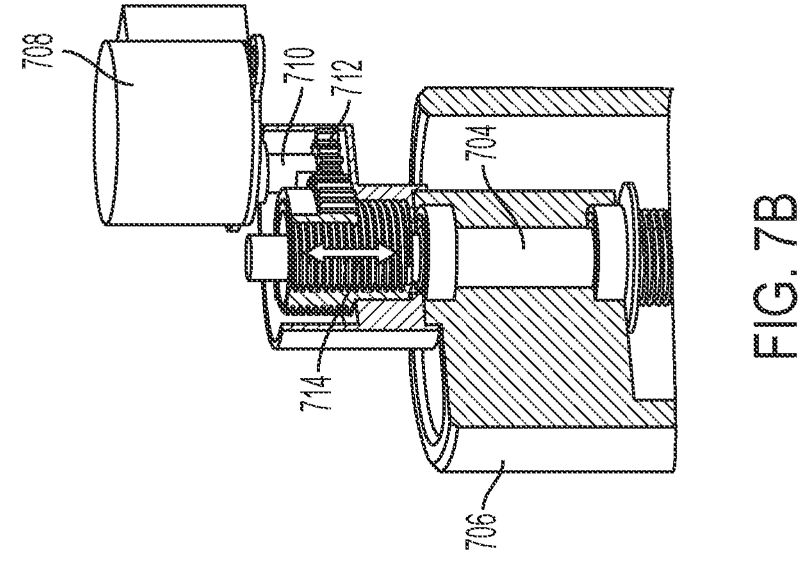
FIGS. 7A-7B are front and perspective cutaway views of a grinder of a brewer, in accordance with an embodiment of the present disclosure.

Turning now to FIGS. 6-7B, a method and assembly for grinding coffee beans or other materials input to the brewer will now be described.

When brewing a cup of coffee, grinding the coffee beans is an important step, as grind size alone can dramatically change the taste of the resulting cup of coffee. In addition, grinding the coffee beans immediately before brewing ensures maximum freshness and flavor of the coffee. Coffee can start to lose its flavor in as little as fifteen minutes after grinding.

When it comes to choosing the grind size for coffee beans, three factors of the selected brewing process make the largest difference: contact time, extraction rate, and flow rate of water through the coffee. Grinding the coffee finer increases the surface area of coffee grounds, increasing the extraction rate and reducing the flow rate of water (thereby increasing contact time). The higher the extraction rate, the less contact time is needed. Knowing this, if you have a brew method with a short contact time, the grind size should be finer. If the contact time is too high or the grind is too fine, the result may be an over-extracted brew that can be bitter. If the grind is too coarse or the contact time is too short, however, the coffee may turn out weak.

The disclosed brewer may recognize the type of coffee beans, how the beans were roasted, and the recommended brewing methods based on the information obtained based on the identification tag on the pod. With this information, the grinder may adjust the grind size and grind the coffee beans immediately before brewing to ensure maximum freshness and flavor.

Figure 7A:
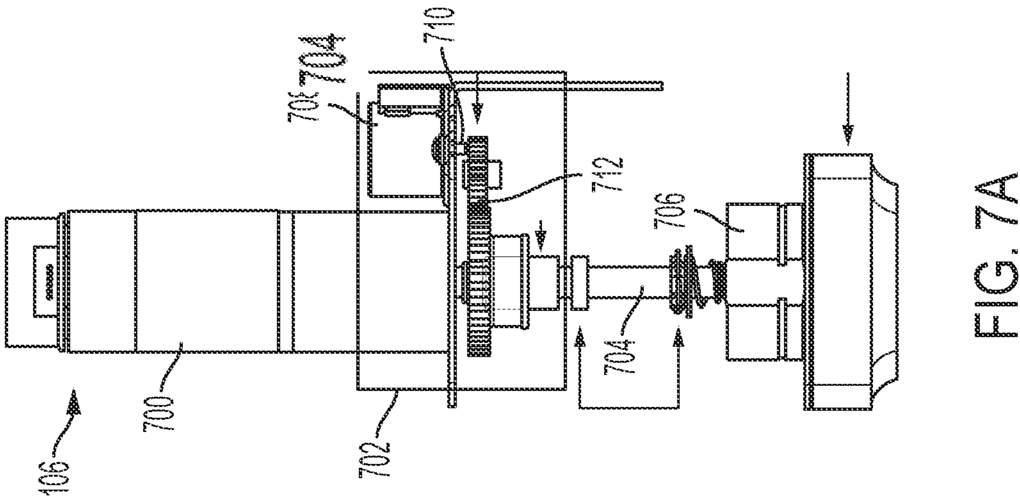

FIG. 6 illustrates a method 600 for grinding whole coffee beans (or other materials) using a brewer, with FIGS. 7A and 7B depict a grinder 106 that performs one or more steps of the method 600. At step 602, the method 600 may include reading the identification tag of the pod from which coffee beans are being supplied to the grinder 106. An electronic reader of the brewer may read the identification tag. At step 604, the method 600 may include receiving a corresponding grind size from a database via a controller of the brewer, as described above with reference to FIG. 2.

The grinder 106 may automatically adjust the grind size (e.g., coarseness level) of the coffee beans based on the recipe detected from the identification tag on the pod and/or based on user preferences (which may be learned by the brewer over time). The grinder 106 may automatically recalibrate and set to zero before and after each brewing operation or certain cycles of operations to guarantee the accuracy of grind size. In particular embodiments, system can recalibrate the burrs after a certain number of grindings (e.g., one, five, ten, or fifty grinding operations), or the users can initiate recalibrate whenever needed. As shown in FIGS. 7A-7D, the grinder 106 may include a main motor 700, a main gearbox 702, a main shaft 704, a burr assembly 706 having an inner burr 716 and an outer burr 718 located in a housing 720, a stepper motor 708 for grind size adjustment, and a magnetic tunnel 722 that sits below the outer burr and collects any stray particles that escape during the grinding process. As shown, the stepper motor 708 may be disposed in the main gearbox 702.

The stepper motor 708 is driving a mechanism that transfers a rotational movement of a secondary shaft 710 through a plurality of gears 712 to a linear movement 714 of the main shaft 704 along its axis. In particular embodiments, the top end of the main shaft 704 may be coupled to threads that, when rotated by the gears 712, cause the main shaft 704 to move upward or downward. The other end of the main shaft 704 may be coupled to an inner burr 716, so the linear movement 714 of the main shaft would in turn adjust the vertical position of the inner burr 716 relative to the outer burr 718.

Figure 7D:
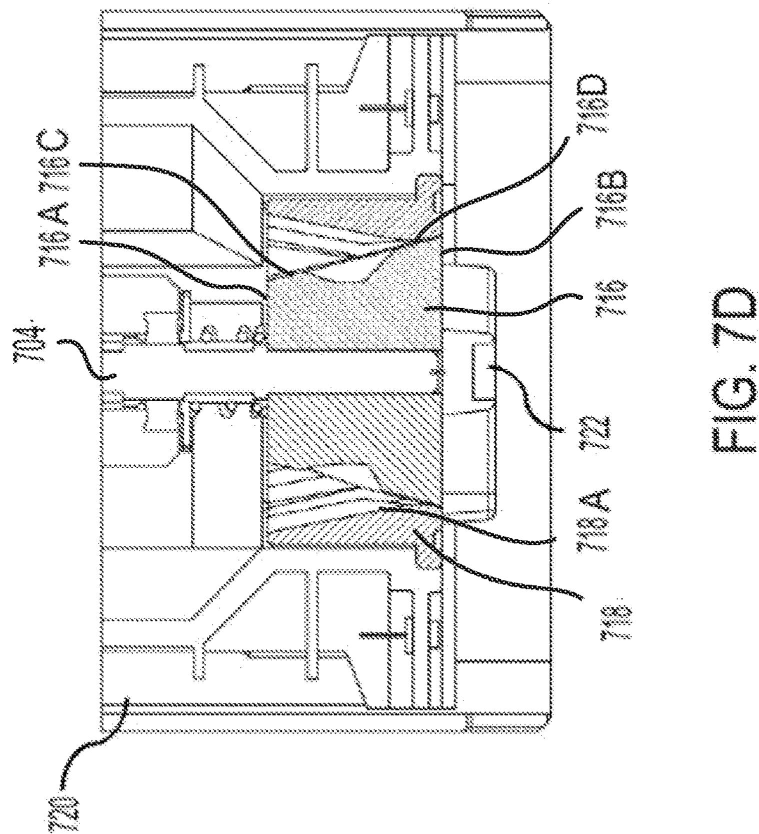
FIGS. 7C-7D are a perspective view and a cross-sectional view of a burr assembly of the grinder of a brewer, in accordance with an embodiment of the present disclosure.
Figure 7C:
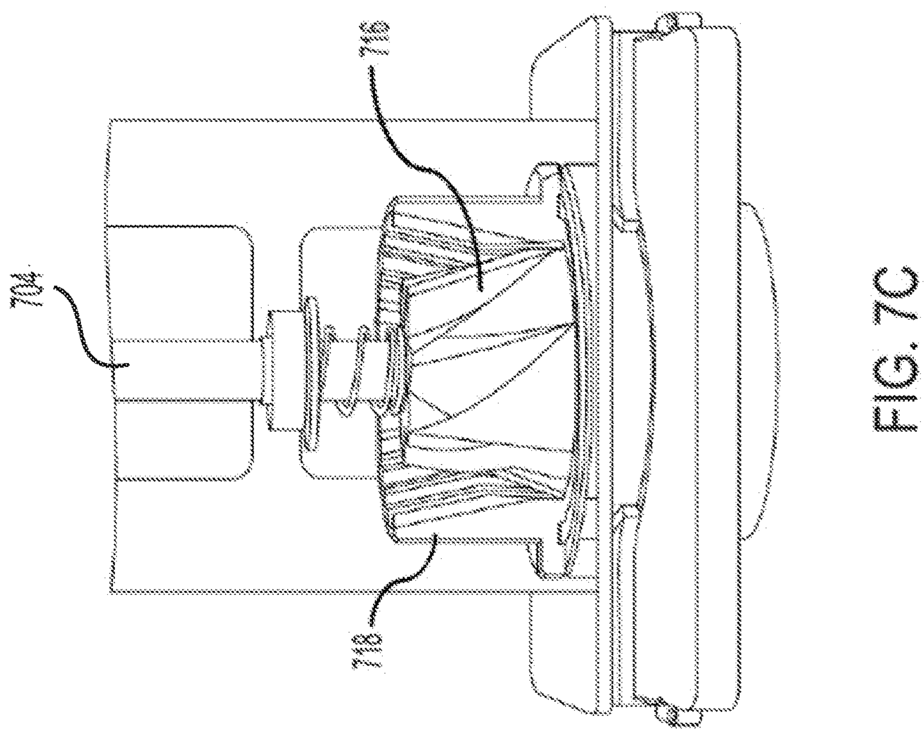

FIGS. 7C and 7D illustrate an embodiment of the burr assembly, which includes an inner burr 716 and an outer burr 718. The inner burr 716 may generally have a truncated conical shape (or a frustrum of a cone), with a rotational axis aligned with that of the main shaft 704. The inner burr 716 may have a top surface 716A, a bottom surface 716B, and a slanted side surface 716C. The inner burr 716's side surface 716C may be abrasive or serrated. The inner burr 716 may move up and down together with the main shaft 704, while the outer burr 716 is stationary and fixed with the main structure of the burr assembly 706. The outer burr 718 may surround the inner burr 716 and may have an abrasive or serrated surface 718A. During a grinding operation, the main motor 700 of the grinder would rotate the main shaft 704, thereby causing the inner burr 716 to rotate relative to the outer burr 718. Coffee beans would fall into the space 716D formed between the abrasive/serrated surface 716A of the inner burr 716 and the abrasive/serrated surface 718A of the outer burr 718. Rotation of the inner burr 716 relative to the outer burr 718 grinds the coffee bean into coffee grounds.

When a finer grind size is selected, the inner burr 716 moves upward, reducing the separation or gap 716D between the inner 716 and outer burrs 718. When a courser grind size is selected, the inner burr moves downward, increasing the gap between the inner and outer burrs. FIG. 7D illustrates the inner burr being in a "zero position." In this position, the separation 716D between the inner burr 716 and the outer burr 718 is at its minimum (i.e., the finest coffee ground size). In particular embodiments, the inner burr 716 may extend downward from the zero position to increase the separation/gap 716D between the inner burr 716 and the outer burr 718. Doing so would result in a relatively coarser coffee ground size.

To stabilize the burr rotation and prevent or reduce the wobbling that may cause the uneven grinding, the main shaft that connects the main gearbox and the burr assembly is a dual-bearing shaft system for coaxially alignment of the rotational movement of the main shaft and the inner burr, resulting in precise and stable grinding. The burrs could have various kinds of surface treatment. For example, the burr assembly may be treated with nitriding, which creates a thin, hard layer of nitride compounds on the surface of the burr to improve its mechanical properties, such as wear resistance, corrosion resistance, and fatigue strength of the burr assembly. Besides adding a layer of coating, like nitride compound, the surface of the burr may be polished for sharpness and durability.

Returning to FIG. 6, at step 606, after retrieving the desired grind size from a database and/or user's setting, the method 600 includes the stepper motor 708 axially moving the main shaft 704 so that a gap 716D between the inner 716 and outer burrs 718 of the burr assembly 706 is closed. That way, the grinder 106 may self-calibrate to a "zero" position setting to ensure the accuracy and consistency of grind size. The main shaft 704 and inner burr 716 may move upward until a gap between the inner burr 716 and outer burr 718 is closed (zero) and set this position as the "zero" position. In other embodiments, instead of performing this step of returning to a zero position at the beginning of the current grind operation, the step may alternatively be performed after the previous grinding operation.

At step 608, the method 600 then includes the stepper motor 708 lowering the main shaft 704 and the inner burr 716 attached thereto to a predetermined position according to the desired recipe to set the gap 716D for the desired grind size from step 604. The method 600 then proceeds to grind the coffee beans in the burr assembly 706 of the grinder 106. This involves the main motor 700 rotating the main shaft 704 and the attached inner burr 716 to grind the coffee beans between the inner 716 and outer burrs 718 in the burr assembly 706. At step 610, a blocking torque from the stepper motor 708 and gear assembly in the main gearbox 702 withstands perturbations during grinding. The system may constantly measure an output torque of the main motor 700 (e.g., via a sensor) to detect if the gap between the outer and inner burrs is in the correct position.

Solid State Pouring System

Figures 8, 9:
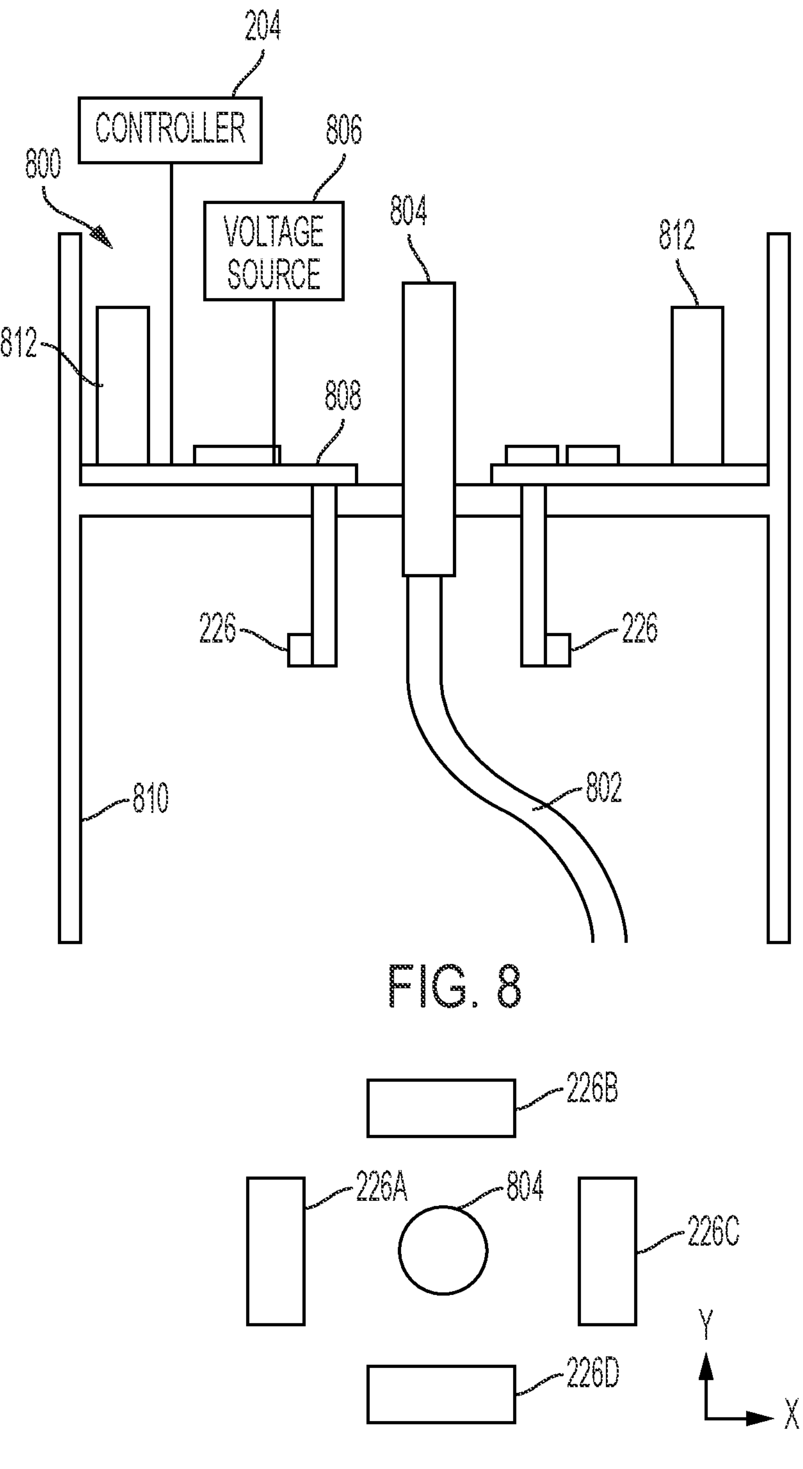
FIG. 8 is a front schematic cutaway view of a solid-state pouring system for use in a brewer, in accordance with an embodiment of the present disclosure.
FIG. 9 is a schematic view of an arrangement of electrodes around a pouring nozzle, in accordance with an embodiment of the present disclosure.

Turning now to FIGS. 8 and 9, a solid-state pouring system for use in the water dispenser portion of the brewer will be described.

An optimal method to prepare black coffee is the method of pour-over, as it accentuates intricate flavors when compared to other brewing methods. This makes it a popular choice for single-origin coffees since it allows the flavors and aromas to shine. For the pour-over method, the choreography of the pours (or "pouring pattern") directly affects the end result of the cup of coffee. As such, the disclosed brewer provides complete control over how each pour is performed. The brewer may reproduce the precision, delicacy, and nuance of each pouring pattern. To achieve such results, the brewer may include a solid state pouring assembly capable of controlling the course of free water streams being dispensed without using any moving parts.

Water ($H_2O$) is a polar covalent molecule, which means that the molecules are attracted to nearby net electrical charges, regardless of the sign of the charges. The attraction force sometimes can be large enough to pull a stream of water toward the charge carriers. Therefore, one can change the direction of the water flow by controlling the distribution of the electric charges in the near vicinity of the water.

FIG. 8 illustrates an example solid state pouring system 800 that may be used to control a water stream 802 output from the brewer. The solid state pouring system 800 includes a water dispenser nozzle 804 configured to dispense the water stream 802, one or more electrodes 226 disposed adjacent to the water stream 802 dispensed by the nozzle 804, and at least one voltage source 806 electrically coupled to the one or more electrodes 226 through an electrical circuit (e.g., on a printed circuit board (PCB) 808). The nozzle 804 may be shaped or otherwise configured to output the water stream 802 in a laminar flow regime, which allows for more precise control of the water stream 802. To apply a desired amount of force to the water stream 802, the electrode(s) 226 are placed near the stream to create and control an electric charge distribution to bend the water stream 802 according to a pouring pattern. The electrode(s) 226 may each include an electrical conductor encased in an electrical isolation material. The electrode(s) 226 may also include a hydrophobic coating surrounding the electrical isolation material that insulates the conductive material from the environment and prevents liquid droplets from sticking to the surface of the electrode(s) 226.

The voltage source(s) 806 may include a high-voltage generator or an electric charge generator. The voltage source(s) 806 may be used to control the charge density on each electrode 226. The force applied by the electrode 226 on the water stream 802 may increase (or decrease) with increasing (or decreasing) charge density. Each electrode 226 can be controlled separately by either an analog input signal or a pulse width modulated (PWM) digital signal. The electrodes' activation patterns (e.g., duration, frequency, sequences, amplitude, etc.) can be set to realize the choreography of any desired pour-over patterns. The solid state pouring system 800 may include a housing 810 that isolates the high-voltage circuits from the rest of the system as well as provides structural support to the system.

Since the disclosed solid state pouring system 800 uses electrical charge on the electrode(s) 226 to bend the water stream 802, the system is able to mechanically manipulate the water stream 802 without using any moving parts of the brewer. The solid state pouring system 800 may enable the brewer to output each pour from the water dispenser according to a desired pouring pattern. The water dispenser of the brewer may control the pouring pattern, among other parameters (e.g., water volume, number of pours, water temperature, etc.), such that the water and coffee are well-mixed.

FIG. 9 represents an example 2-dimensional arrangement of electrodes 226 around a nozzle 804 and/or water stream dispensed from the nozzle 804, as viewed in a plane perpendicular to a longitudinal axis of the nozzle 804. The solid state pouring system may include four electrodes 226 arranged about the water stream. The electrodes 226 may each be equidistantly spaced from the water stream, with two electrodes (226A and 226C) on opposite sides of the nozzle 804 from each other in a direction parallel to an X-axis, and the other two electrodes (226B and 226D) on opposite sides of the nozzle 804 in a direction parallel to a Y-axis. Such a placement of electrodes 226 with respect to the nozzle 804 allows the brewer to control the water stream by controlling a force vector in orthogonal directions. That is, the system may control the charge applied to each of the four electrodes 226 via vector control (e.g., in the X-axis and Y-axis directions) to control the direction the water stream is bent during each pour. This arrangement of electrodes 226 enables the solid state pouring system to control the 360-degree radial orientation of the water stream around the axis of the nozzle 804. The solid state pouring system may also control the amplitude of the water stream away from a center (e.g., longitudinal axis of the nozzle 804). The solid state pouring system may provide time series control of the electrodes 226 to control the shape of a pour with respect to time. The solid state pouring system may provide any desired pouring pattern such as, for example, a spiral pouring pattern (e.g., growing from the center toward the outside, or vice versa) for each pour and output at any desired speed.

Solid State Pouring System Embodiments

Additional details regarding the solid state pouring system of the brewer will now be provided. Referring to both FIGS. 8 and 9, a brewer (e.g., 100 of FIG. 1) may include a water dispenser (e.g., 104 of FIG. 1) having a nozzle 804 configured to dispense the stream of water 802 downward. As discussed above with reference to FIG. 1, the brewer (e.g., 100) may also include a holder (e.g., capsule dock 108) configured to hold a container (e.g., pod 102) for coffee grinds or tea below the nozzle 804 to receive the stream of water 802. The brewer may include a first electrode 226A disposed adjacent to the stream of water 802 dispensed by the nozzle 804, and a voltage source 806 electrically coupled to the first electrode 226A through an electrical circuit (e.g., on the PCB 808). In addition, the controller 204 of the brewer may be communicatively coupled to the electrical circuit and configured to control a magnitude of the voltage applied to the first electrode 226A from the voltage source 806. Varying the magnitude of the voltage applied to the first electrode 226A generates an electrical field that changes a distance of the stream of water 802 from the first electrode 226A.

Similarly, the brewer may include a second electrode 226B disposed adjacent to the stream of water 802 dispensed by the nozzle 804 and electrically coupled to the voltage source 806 through a second electrical circuit (e.g., on the PCB 808). Controller 204 may be communicatively coupled to the second electrical circuit and configured to control the magnitude of the voltage applied to the second electrode 226B from the voltage source 806.

As shown in FIG. 9, the brewer may further include a third electrode 226C and a fourth electrode 226D. The third electrode 226C may be disposed adjacent to the stream of water dispensed by the nozzle 804 and electrically coupled to the voltage source 806 through a third electrical circuit (e.g., on the PCB 808). In addition, the fourth electrode 226D may be disposed adjacent to the stream of water dispensed by the nozzle 804 and electrically coupled to the voltage source 806 through a fourth electrical circuit (e.g., on the PCB 808). The controller 204 may be communicatively coupled to the third electrical circuit and to the fourth electrical circuit and configured to control a magnitude of the voltage applied to the third electrode 226C and a magnitude of the voltage applied to the fourth electrode 226D from the voltage source 806. As shown in FIG. 9, the four electrodes 226A-D may be located equidistant from each other circumferentially around an axis of the nozzle 804.

Although FIG. 8 shows two electrodes 226 and FIG. 9 shows four electrodes 226A-D, it should be noted that the solid-state pouring system 800 may include any other desired number of electrodes 226 such as one, three, five, six, seven, eight, nine, ten, or more. In addition, although FIG. 9 shows the four electrodes 226A-D arranged in a two-dimensional array around the stream of water output by the nozzle 804, it should be noted that in other embodiments, multiple electrodes 226 may be arranged in three dimensions with respect to each other and the water stream to provide the desired pouring control.

The electrode(s) 226 in the solid state pouring system 800 may be connected to the voltage source 806 through one or more electrical circuits, which may include transformer(s) 812. The electrical circuit(s) may be capable of supplying a voltage on the order of 5,000 Volts or more to the electrode(s) 226. The electrical circuit(s) may be controlled to provide a high voltage signal to the electrode(s) 226 at very low current, on the order of micro-Amps, to charge the electrode(s) 226. Once an electrode 226 is fully charged, the density of the charge is 100% in the electrode 226 and this attracts water via the charge of the electrode 226. However, the charge can be adjusted to anywhere from 0-100% to vary the charge density, thereby adjusting how far the water is moved toward the electrode 226. The controller 204 may control the electrical circuit(s) connecting the voltage source 806 and the electrode(s) 226 to adjust the charge on one or more electrodes 226 surrounding the water stream 802 over time, thereby varying the position of the water stream 802 according to a desired pouring pattern. For example, the controller 204 may adjust the magnitude of voltage applied to an electrode 226 according to a sinusoidal curve, a Gaussian curve, a linear function, and so forth. The controller 204 may contain in memory instructions for adjusting the charge on one or more electrodes 226 according to a group of pre-set waveforms (e.g., associated with common pouring patterns).

As shown in FIG. 9, the first pair of electrodes 226A and 226C may be used to control the magnitude of a force vector in the X-direction. The second pair of electrodes 226B and 226D may be used to control the magnitude of a force vector in the Y-direction. By controlling the direction and the magnitude of the force vector at any given time, it is possible to create any flowing patterns of the water stream. For example, the electrodes may be charged in sinusoidal curves, Gaussian curves, etc. to create a spiral motion or circular motion, etc. The same principle can also be applied in three-dimensional applications.

Figure 10:
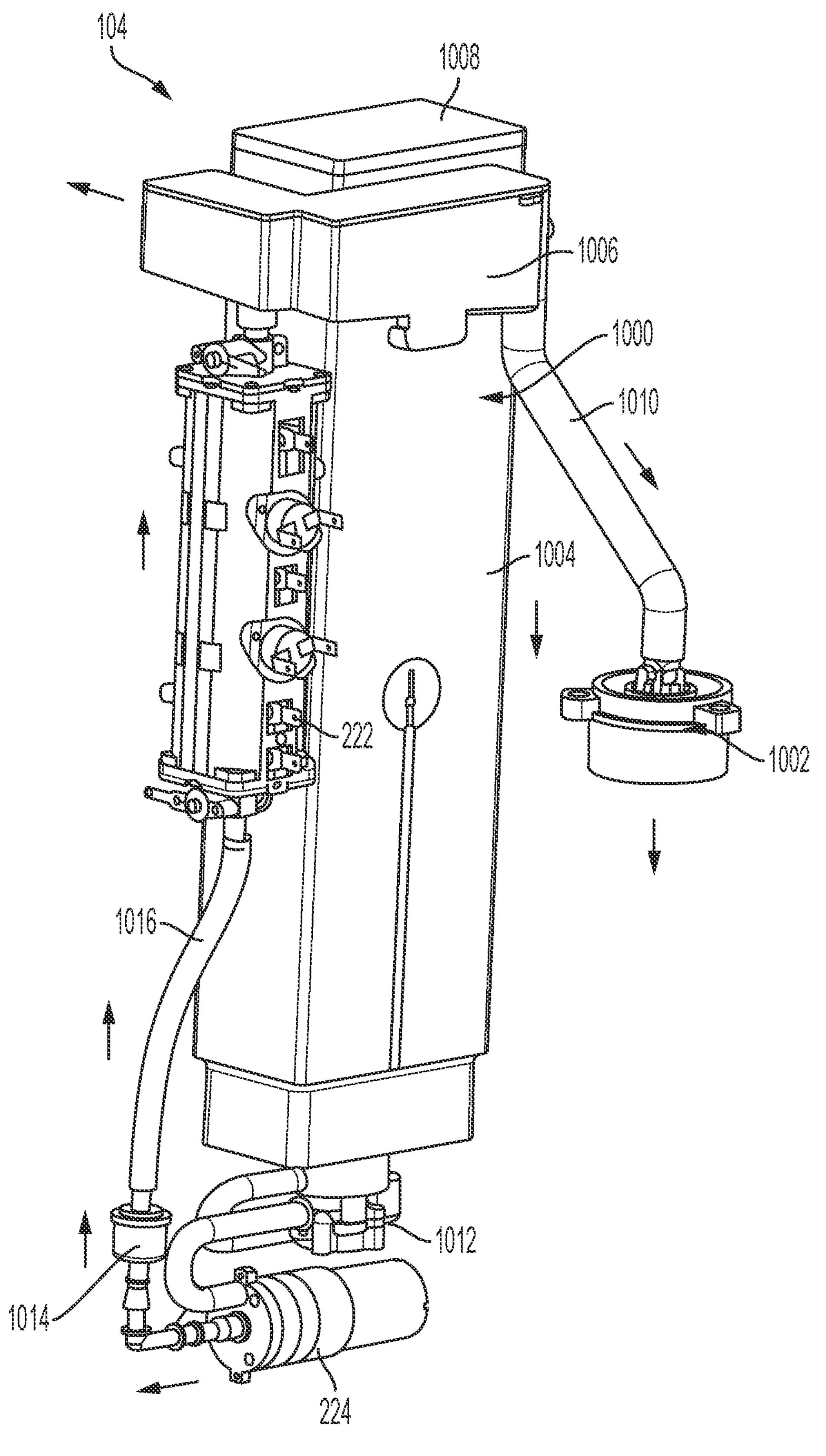
FIG. 10 is a perspective view of a water dispenser for a brewer, in accordance with an embodiment of the present disclosure.

FIG. 10 depicts an example water dispenser 104 that may use the solid state pouring system of FIG. 8. As shown, the water dispenser 104 includes a water tank 1000, a heater 222, a pump 224, and a pouring nozzle assembly 1002 containing components (e.g., nozzle and electrode(s)) of the solid-state pouring system where water is output from the water dispenser 104. These and other components of the solid-state pouring system may be enclosed within a housing (not shown), which may include a plastic enclosure, a metallic Faraday cage with an insulative coating, and/or a thick insulative coating or mold that covers the entire module.

The water tank 1000 may include one or more reservoirs having one or multiple inlets and outlets. In the illustrated embodiment, the water tank 1000 includes a main water tank 1004, an intermediate water tank 1006, and a top cover 1008. The top cover 1008 may be removed to refill the main water tank 1004, which acts as a reservoir for water to be used for brewing operations. The intermediate water tank 1006 may hold heated water that is being dispensed through a water outlet 1010 to the pouring nozzle assembly 1002 during a brewing operation.

The pump 224 and heater 222 may be fluidly coupled between the main water tank 1004 and the intermediate water tank 1006 to simultaneously pump and heat the water being supplied to the intermediate tank 1006. The pump 224 may be controlled to adjust the flow rate of water being dispensed from the brewer in a particular pour, as well as to control the volume of the particular pour. The pump 224 may be part of a flow module including a flowmeter 1012 and a one-way valve 1014. A water inlet 1016 provides the pumped water to the heater 222. The heater 222 may be an "instant heater" in the form of a heat pipe that quietly heats water to an exact temperature as the water is pumped through the heater 222 and into the intermediate tank 1006. From the intermediate tank 1006, the water flows through the water outlet 1010 to the nozzle outlet 1001, which then outputs the heated water from the water dispenser 104 according to a pouring pattern. Other components and arrangements thereof may be used in the water dispenser 104 than those described herein.

Figures 11A, 11B, 11C:
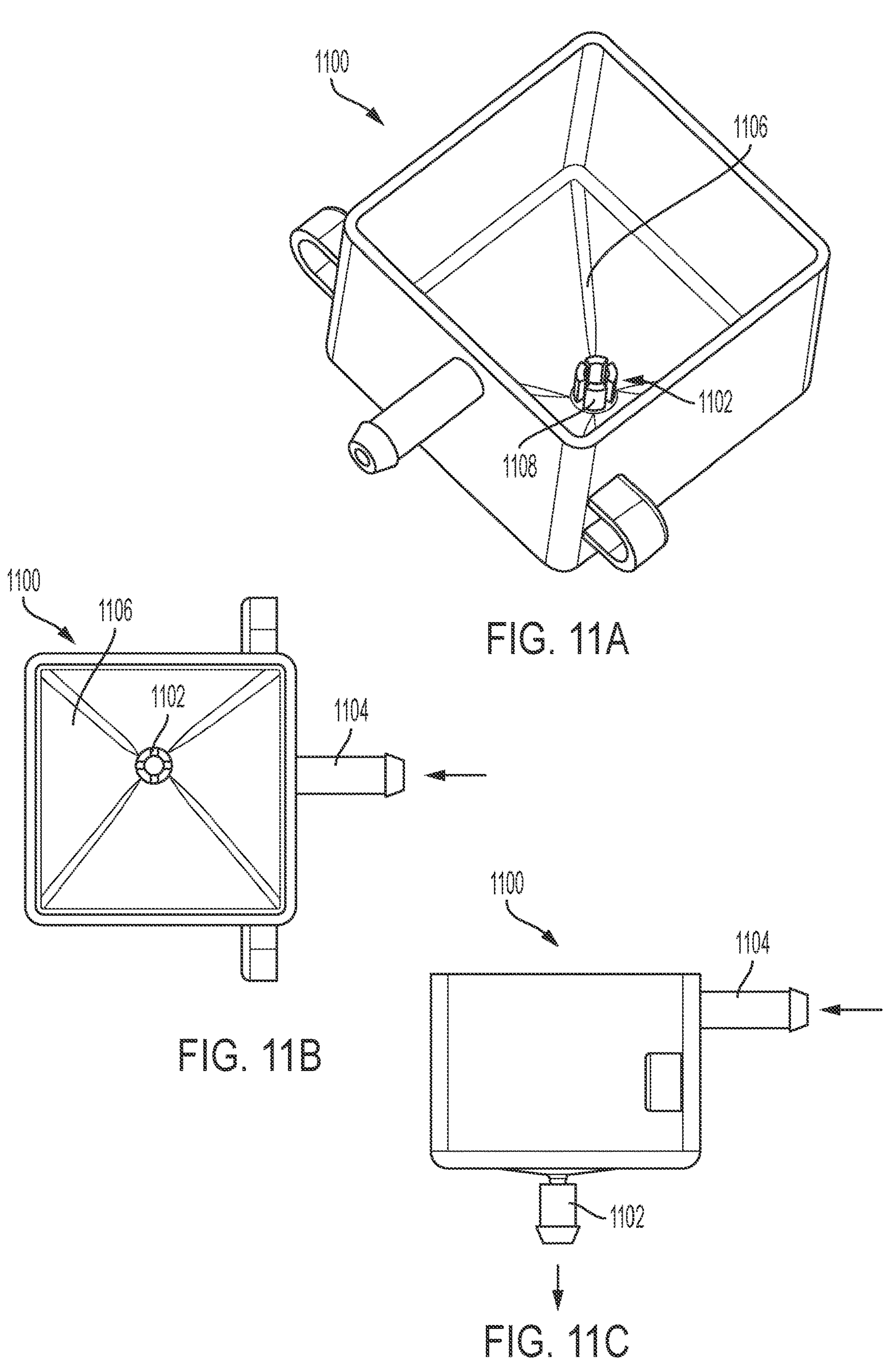
FIGS. 11A-11C are perspective, top, and side views of a water outlet of a pouring assembly for a brewer, in accordance with an embodiment of the present disclosure.

FIGS. 11A-11C depict an example of a water tank 1100 that may function as an intermediate tank (e.g., 1006 of FIG. 10). The water tank 1100 may be specially designed to output a laminar flow of water from its nozzle 1102. Turbulent, heated water may be input from a heater (e.g., 222 of FIG. 10) to the water tank 1100 via a hot water inlet 1104, and sloped internal walls 1106 of the water tank 1100 together with protrusions 1108 surrounding the nozzle 1102 may change the flow regime of the heated water from turbulent to laminar while maintaining a desired flow rate of the water from the nozzle 1102.

Figures 12A, 12B:
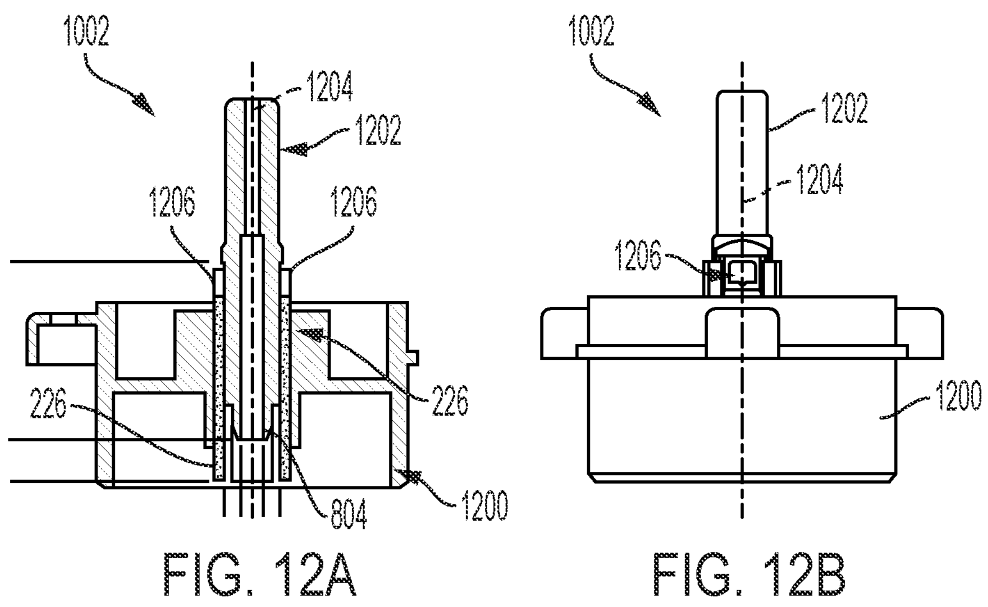
FIGS. 12A and 12B are cutaway and side views of a pouring nozzle assembly having electrodes incorporated therein, in accordance with an embodiment of the present disclosure.

FIGS. 12A and 12B depict an example of the pouring nozzle assembly 1002 of FIG. 10. The pouring nozzle assembly 1002 may include a mounting base 1200, a supporting axis 1202, the nozzle 804, and a plurality of electrodes 226. The mounting base 1200 may mount the pouring nozzle assembly 1002 to the brewer such that the nozzle 804 extends downward from the water dispenser of the brewer. The supporting axis 1202 may be attached to a water outlet (e.g., 1010 of FIG. 10) of the water dispenser. The supporting axis 1202 is aligned with a longitudinal axis 1204 of the nozzle 804 and may direct water from the water outlet in this axial direction through the nozzle 804.

In FIG. 12A, two electrodes 226 are illustrated, one on each side of the nozzle 804. It should be noted that, similar to FIG. 9, the pouring nozzle assembly 1002 may also include two other electrodes 226 surrounding the nozzle 804. Each electrode 226 may extend in a direction parallel to the longitudinal axis 1204 of the nozzle 804 and be located equidistant from the longitudinal axis 1204. The electrodes 226 may be precisely located in the X-Y plane with respect to the longitudinal axis 1204 of the nozzle and precisely vertically positioned in a Z-direction with respect to the end of the nozzle 804 to exert a desired force for changing the water stream output from the nozzle 804. For example, as shown, the electrodes 226 may extend downward below a lower end of the nozzle 804. In an example, e.g., as shown in FIG. 8, the electrode(s) 226 may be separate from and spaced apart from the nozzle 804. In another example, e.g., as shown in FIGS. 12A and 12B, the electrode(s) 226 may be integrated onto an outer edge of the nozzle 804. Having the electrodes 226 close to the nozzle 804 in this manner may improve the efficiency of the solid-state pouring system.

At an upper portion of each electrode 226, a conductive pad 1206 may be located to electrically contact a component of an electrical circuit used to control the charge on the electrode 226. As shown, the conductive pad 1206 may be located on an opposite side of the mounting base 1200 from the location where the nozzle 804 outputs water, thereby preventing water from contacting the conductive pad 1206.

Figure 13:
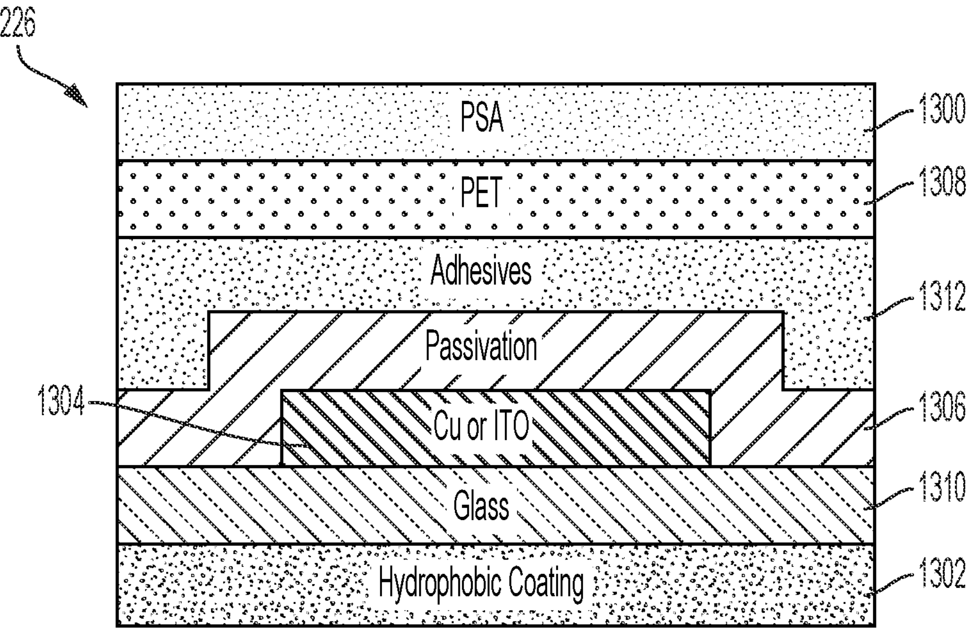
FIG. 13 is a schematic view of layers forming an electrode, in accordance with an embodiment of the present disclosure.

FIG. 13 illustrates a cross-sectional view of an example electrode 226, as viewed from a direction parallel to the longitudinal axis of the nozzle. As illustrated in FIG. 13, the "uppermost" layer (PSA 1300) may form a side of the electrode 226 located farthest from a water stream output by the nozzle when the water dispenser is assembled, and the "lowermost" layer (hydrophobic coating 1302) may form a side of the electrode 226 located closest to the water stream output by the nozzle when the water dispenser is assembled. The cross-section shows various layers that may be present within the electrode 226, although other embodiments of the electrode 226 may have other numbers, different types of materials, and/or arrangements of the layers than shown in FIG. 13. This is merely an illustrative embodiment, and variations of the electrode 226 may be possible without departing from the scope of this disclosure.

The electrode 226 may include a pressure-sensitive adhesive (PSA) 1300 on one side thereof for attaching the electrode 226 to a structure (e.g., mounting base 1200 in FIG. 12A) of the brewer. The electrode 226 generally includes an electrical conductor 1304 to which a high voltage low current signal is applied to charge the electrode 226. The electrical conductor 1304 may include any metallic materials (e.g., copper, indium tin oxide, etc.), a conductive ink or paint applied to another layer of the electrode 226, or a conductive thin film sandwiched between two other layers of the electrode 226. The electrode 226 may also include a passivation layer 1306 disposed around at least one side of the conductor 1304 to remove surface contamination and provide resistance to corrosion.

The conductor 1304 may be encased in at least one electrical isolation material. For example, the conductor 1304 may be sandwiched on both sides by an electrical isolation layer 1308, 1310. These electrical isolation layers 1308, 1310 may isolate the conductor 1304 from the environment, for example, to prevent arcing. The conductor 1304/passivation layer 1306 may be coupled to one or both electrical isolation layers 1308, 1310 by one or more adhesive layers 1312. The electrical isolation layers 1308, 1310 may be composed of glass, a thermoplastic or other polymer material, or any other material capable of providing electrical insulation. In the illustrated embodiment, one electrical isolation layer 1308 is made from polyethylene terephthalate (PET), while the other electrical isolation layer 1310 is made from glass. Glass may provide improved structural stability compared to PET and other similar polymers, but glass may be more expensive. In other embodiments, both electrical isolation layers 1308 and 1310 may be constructed from the same material (glass, PET, etc.).

The electrode 226 may include a hydrophobic coating 1302 provided at least on a side of the electrode 226 that faces the water stream output from the nozzle. In FIG. 13, for example, the hydrophobic coating 1302 is surrounding the electrical isolation layer 1310 closest to the water stream. The hydrophobic coating 1302 prevents water ingress into the electrode 226 from the water stream so that water does not create micro-channeling and/or short the device. The hydrophobic coating 1302 may include, for example, a fluorinated polymer coating, or a coating containing nanomaterials or nanostructures. Although illustrated as being located on just one side of the electrode 226, in other embodiments the hydrophobic coating 1302 may extend around additional sides of the electrode 226 as well, up to 360 degrees around the entirety of the electrode structure.

Figure 14A:
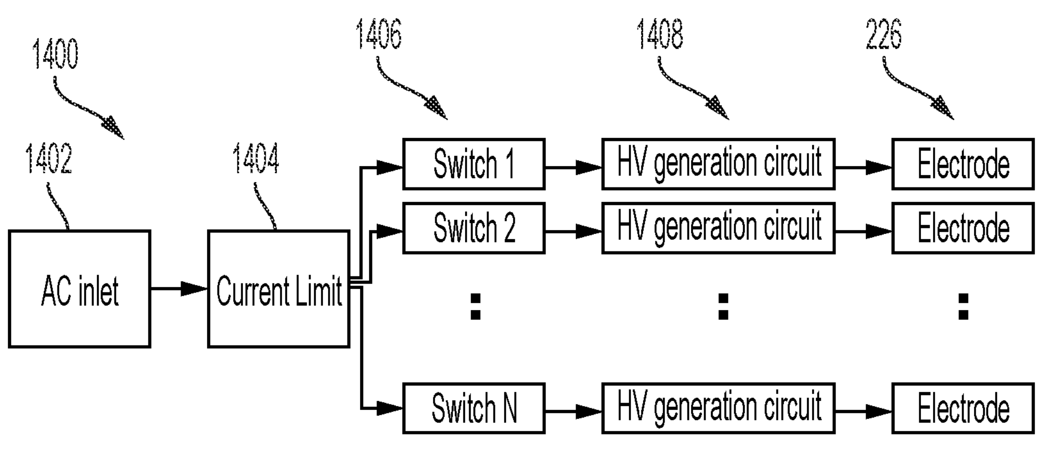
FIGS. 14A-14C are schematic block diagrams illustrating solid-state assemblies for controlling electrodes, in accordance with an embodiment of the present disclosure.

FIG. 14A depicts an electronics assembly 1400 that may be used to control the charge applied to multiple electrodes 226 of the solid state pouring system. The assembly 1400 may include, for example, a power source (e.g., AC voltage inlet) 1402, a current limiter 1404, and a plurality of switches 1406 each corresponding to one of a plurality of electrodes 226 present in the solid state pouring system. Note that the assembly 1400 may be used in a solid state pouring system having any desired number of electrodes 226. The assembly 1400 also includes a plurality of electrical circuits 1408 (e.g., high voltage generation circuits) each corresponding to one of the electrodes 226. The electrical circuits 1408 may each include a high voltage transformer (e.g., 812 of FIG. 8) configured to amplify an electrical signal transferred from the voltage source (e.g., 806 of FIG. 8) to the corresponding electrode 226. The high voltage transformer may be a piezoelectric transformer or an electromagnetic transformer.

Figure 14B:
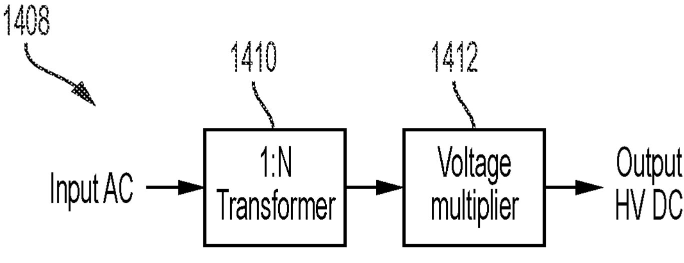
Figure 14C:
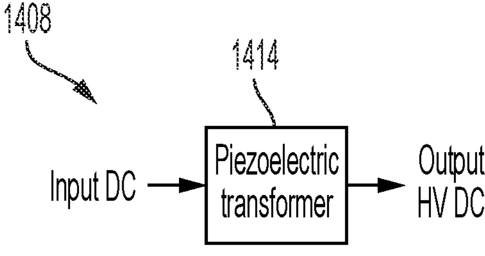

FIGS. 14B and 14C illustrate two examples of the electrical circuit 1408 that may be used between an input AC voltage and a DC high voltage output to an electrode 226. In FIG. 14B, the electrical circuit 1408 includes an electromagnetic transformer 1410 and a voltage multiplier 1412. In FIG. 14C, the electrical circuit 1408 includes a piezoelectric transformer 1414.

Turning back to FIG. 14A, a controller of the brewer may output control signals to the switches 1406 to control which of the electrodes 226 are charged at different points in time. In addition, the controller may output control signals to the electrical circuits 1408 to control the charge amplitude of the electrodes 226 that are being charged over time. The controller may output control signals for opening or closing the switches 1406 and controlling the electrical circuits 1408 according to a pre-set vector control scheme corresponding to a pouring pattern stored in memory.

Figure 15:
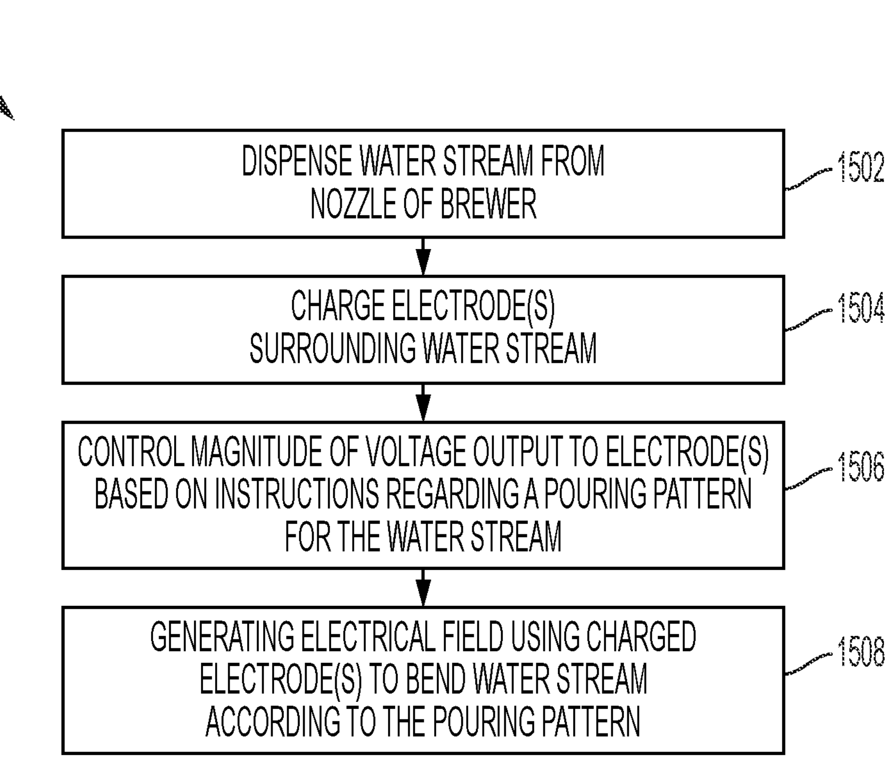
FIG. 15 is a process flow diagram of a method for controlling a water stream output from a brewer, in accordance with an embodiment of the present disclosure.

FIG. 15 depicts a method 1500 for controlling a water stream output from a brewer. At step 1502, the method 1500 includes dispensing the water stream from a nozzle of the brewer into a container for coffee grinds or tea. The water stream may be a laminar flow of water output from the nozzle of the brewer. At step 1504, the method 1500 includes charging one or more electrodes surrounding the water stream dispensed by the nozzle using one or more electrical circuits coupled between the one or more electrodes and a voltage source. This may involve, for example, amplifying a voltage output from the voltage source via a transformer located in one of the electrical circuits. At step 1506, the method 1500 includes controlling a magnitude of a voltage output to each of the one or more electrodes via a controller based on instructions received at the controller regarding a pouring pattern for the water stream. At step 1508, the method includes generating an electrical field using the one or more charged electrodes to bend the water stream dispensed by the nozzle according to the pouring pattern. In an embodiment, the method 1500 may include dispensing the water stream from a nozzle of the brewer into a container specifically for coffee grinds, and generating the electrical field to bend the water stream dispensed by the nozzle according to a pour-over coffee pouring pattern.

Figure 16:
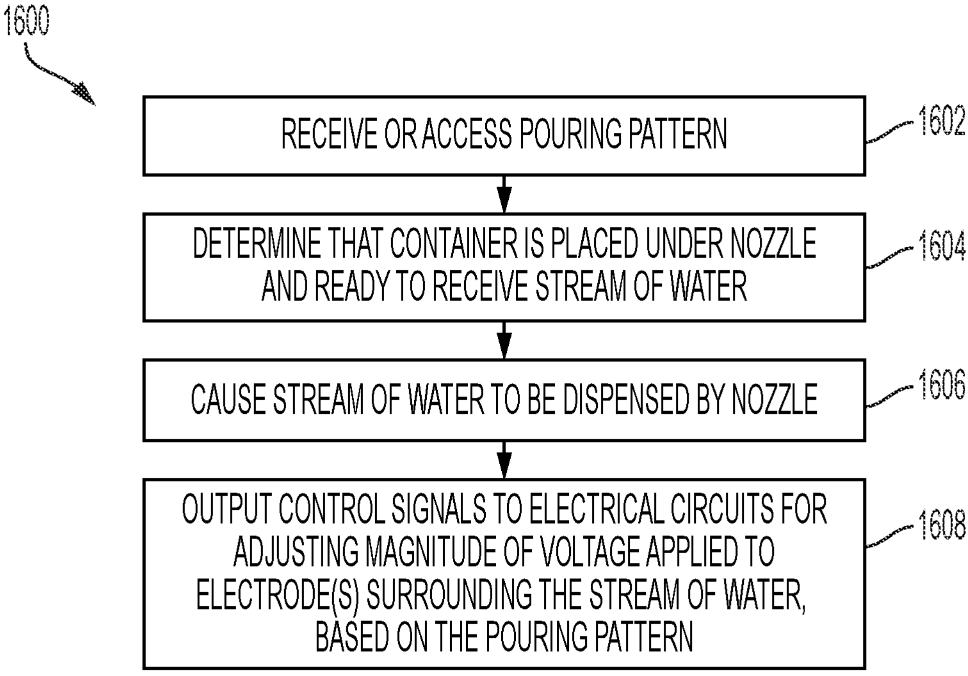
FIG. 16 is a process flow diagram of a method for controlling the pouring of water from a brewer, in accordance with an embodiment of the present disclosure.

FIG. 16 depicts a method 1600 for controlling pouring of water from a brewer. One or more steps of the method 1600 may be computer-implemented steps. A computer may include one or more processors and a non-transitory computer-readable medium comprising instructions that, when executed by the one or more processors, cause the computer to perform one or more steps of the method 1600. At step 1602, the method 1600 includes receiving or accessing a pouring pattern indicative of a dynamic pattern in which a stream of water is to be dispensed in different directions relative to a stationary nozzle. At step 1604, the method 1600 includes determining that a container for coffee grinds or tea is placed under the stationary nozzle and ready to receive the stream of water. At step 1606, the method 1600 includes causing the stream of water to be dispensed by the stationary nozzle in response to the determination that the container is ready. At step 1608, the method 1600 includes outputting control signals to one or more electrical circuits (e.g., four electrical circuits) for adjusting a magnitude of voltage applied to each of a plurality of electrodes (e.g., four electrodes) surrounding the stream of water while the stream of water is being dispensed. The output control signals are generated based on the pouring pattern, which may be an expanding spiral, an inward-moving spiral, a circle, a point, a line, a wave shape, or a zig-zag. In this method 1600, at least one of the control signals output to an electrical circuit may cause an adjustment of the magnitude of voltage applied to the corresponding electrode according to a sinusoidal curve, a Gaussian curve, or a linear function.

The disclosed solid-state pouring system provides a highly integrated system for controlling a water stream according to a pouring pattern without using any moving parts, motors, or actuators. This provides a quiet, compact, durable, and highly precise method for outputting hot water in specially tailored patterns for brewing high-quality beverages.

Single-Serving Pod Embodiments

Additional details regarding single-serving pods compatible with the disclosed brewer will now be provided. Turning back to FIG. 4, the illustrated single-serving pod 102 includes a plurality of whole coffee beans 408 located within a capsule 400. The plurality of whole coffee beans 408 may include a number of whole coffee beans sufficient for brewing a single cup of coffee. The capsule 400 is configured to hold the whole coffee beans 408 therein and to later receive coffee grounds made from the whole coffee beans 408.

Figure 19:
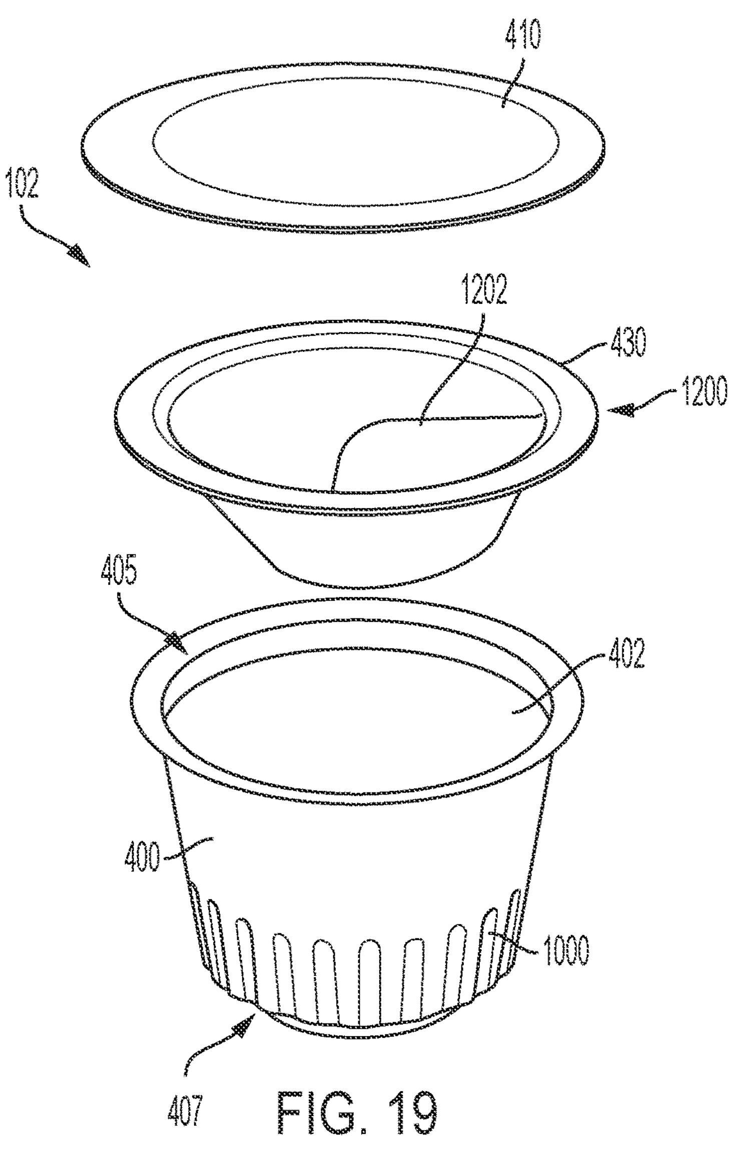
FIG. 19 is an exploded view of another example single-serving coffee pod, in accordance with an embodiment of the present disclosure.
Figure 20:
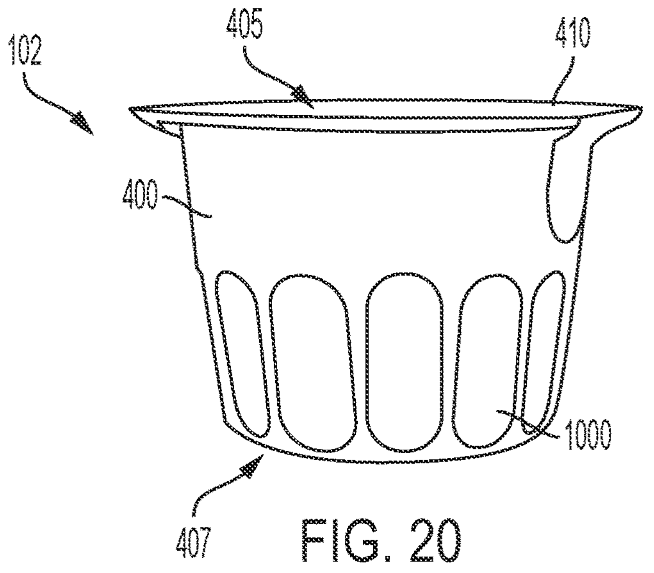
FIG. 20 is a side view of another example single-serving coffee pod, in accordance with an embodiment of the present disclosure.

FIGS. 17A-17D are additional views of the single-serving pod 102 of FIG. 4. FIG. 18A illustrates another example single-serving pod 102, and FIGS. 18B and 18C depict the corresponding capsule 400 of that pod 102. FIG. 19 illustrates another example single-serving pod 102, and FIG. 20 illustrates yet another example single-serving pod 102. Similar elements on each pod 102 of FIGS. 17A-D are labeled with similar element numbers as in FIG. 4.

In general, the hollow capsule 400 holding the brewing agent is frustoconical in shape. The capsule 400 may include extraction features for providing a more effective extraction of flavor during the brewing process. For example, the capsule 400 may feature a combination of specially designed ribs, grooves, indentations, protrusions, and dripping holes to optimize extraction efficiency and outcomes. This design may reduce clogging caused by coffee grounds and the filter 402, which may otherwise lead to over-extraction and bitterness of the coffee.

As an example, in FIGS. 17A-D the capsules 400 each includes a pattern of indentations and/or protrusions 1000 formed along a side wall of the capsule 400. Indentations and/or protrusions 1000 along the side wall of the capsule 400 may introduce airflow between the edge of the capsule 400 and the filter 402, thereby helping with coffee extraction. Indentations and/or protrusions 1000 along the side wall of the capsule 400 may also increase the structural stability of the single-serving pod 102, so that the pod 102 does not become deformed during transport. The indentations and/or protrusions 1000 may be different sizes or shapes in different embodiments, as illustrated in FIGS. 17A-D. The indentations and/or protrusions 1000 may extend in a vertical direction along the side wall of the capsule 400 and may extend only part of the way from the bottom end 407 of the capsule 400 toward the upper end 405 of the capsule 400.

Figures 17D, 18A, 18B, 18C:
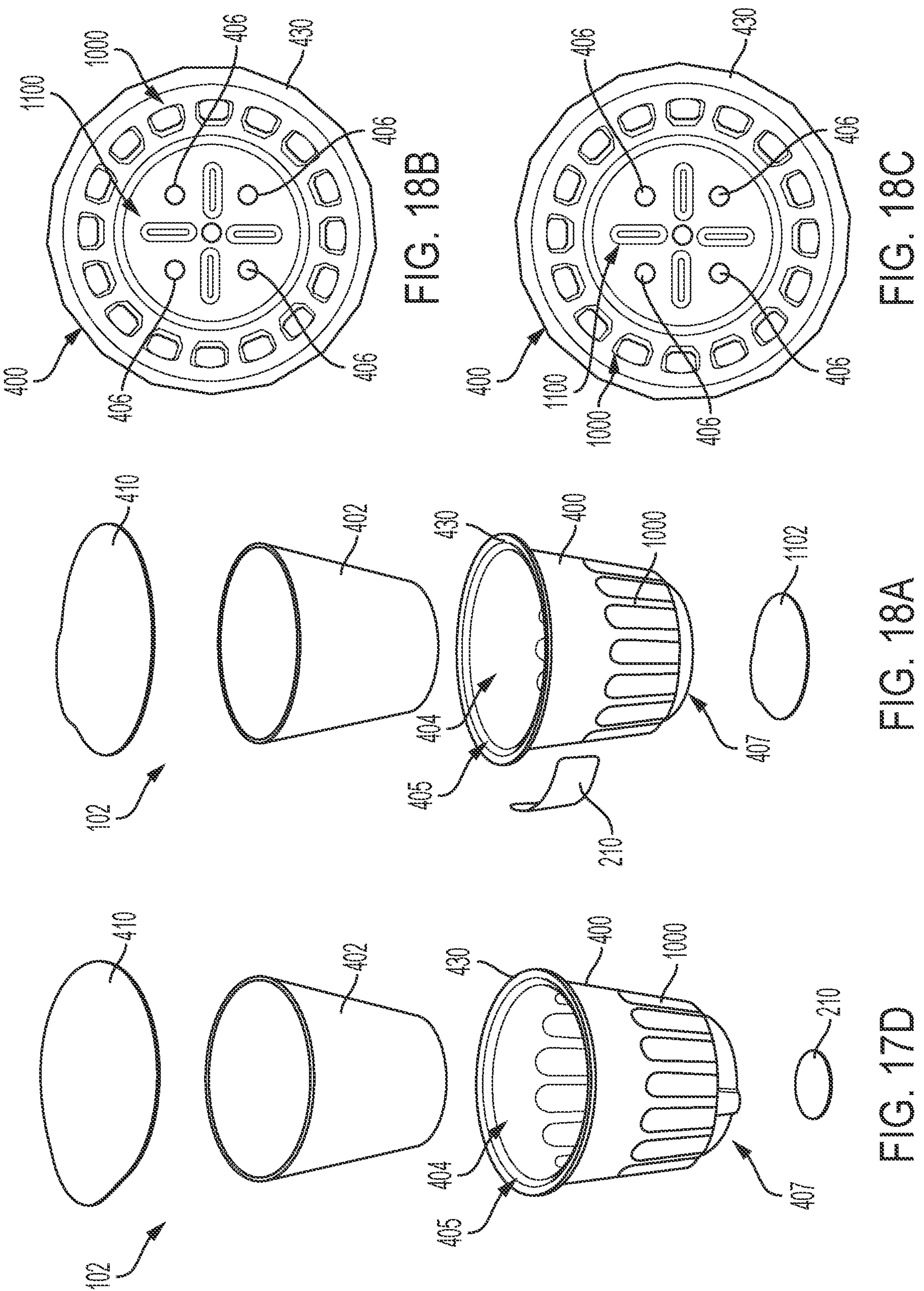
FIGS. 18A-18C are exploded, bottom, and top views of another example single-serving coffee pod, in accordance with an embodiment of the present disclosure.

As another example, in FIGS. 18B and 18C, the capsule 400 includes a pattern of indentations and/or protrusions 1100 formed on the second end 407 of the capsule 400. Such indentations and/or protrusions 1100 may add some distance between the bottom of the filter (not shown) and the bottom of the capsule 400 to provide increased water flow and therefore better extraction. In addition, the indentations and/or protrusions 1100 may increase the structural stability of the single-serving pod 102, so that the pod 102 does not become deformed during transport. The openings 406 in the bottom of the capsule 400 may be arranged in a specific pattern around the indentations and/or protrusions 1100 to help with extraction and smooth the dripping.

As shown in FIGS. 4, 17A, 17D, and 18A, the single-serving pod 102 may include an identification tag 210 disposed on the capsule 400. The identification tag 210 is configured to be scanned by a reader (e.g., of the brewer). The identification tag 210 is configured to provide or trigger access to information upon scanning of the identification tag by the reader. This information may correspond to the whole coffee beans held in the capsule 400, to a recipe for brewing coffee from whole coffee beans in the capsule 400, or both. In this way, the identification tag 210 may represent or contain information stored thereon about the whole coffee beans and/or a method for brewing coffee from the beans. The information corresponding to the coffee beans may include, for example, a bean name, a bean type, a bean growing region, a grower, a roaster, a processing method, a roasting date, a packing factory, a packaging date, or a best-by date. The information corresponding to the recipe for brewing coffee from the beans may include, for example, a grind size, a water temperature, a water volume, a pouring pattern, a number of pours, or an agitation instruction. The identification tag 210 may comprise a radio frequency identification tag (RFID tag). As discussed at length above, the identification tag 210 may have an SKU stored therein, which can be used by the brewer to access additional information corresponding to the coffee beans and/or the brewing recipe from an external network.

Figures 17A, 17B, 17C:
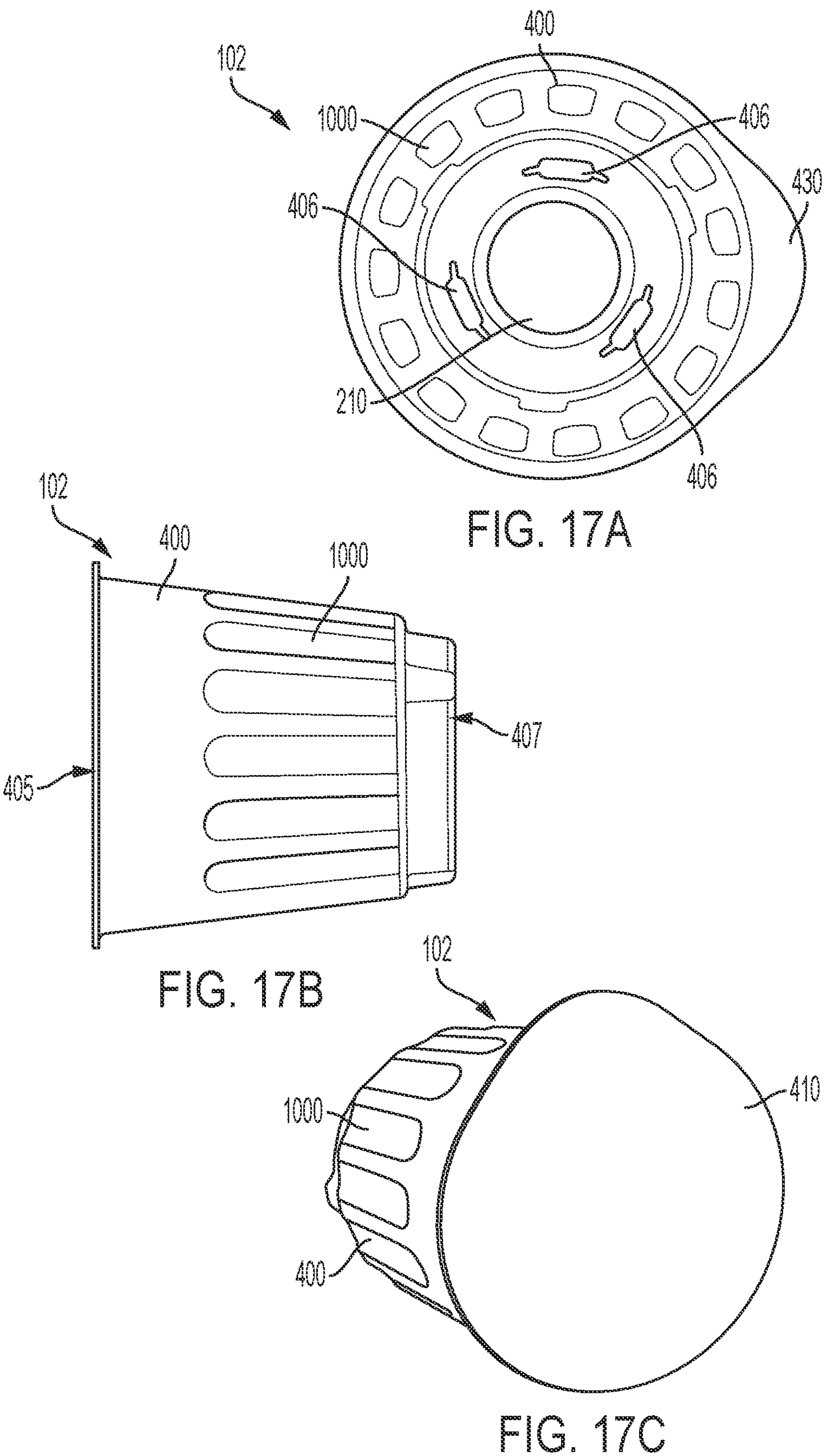
FIGS. 17A-17D are bottom, side, perspective, and exploded views of an example single-serving coffee pod, in accordance with an embodiment of the present disclosure.

As illustrated in FIGS. 4, 17A, and 17D, the identification tag 210 may be disposed on the second end 407 of the capsule 400. As shown in FIG. 17A, the drip openings 406 in the second end 407 of the capsule 400 may be specially shaped and/or arranged around a perimeter of the identification tag 210. In another example, as shown in FIG. 18A, the identification tag may be disposed along a side wall of the capsule 400.

As shown in FIGS. 4, 17C, 17D, 18A, 19, and 20, the capsule 400 may be sealed at the upper end 405 by the removable covering 410. This removable covering 410 may be sealed to a flange 430 surrounding the opening 404 at the upper end 405 via application of heat, so that no adhesive material is left on the capsule 400 upon removal of the covering 410. In other embodiments, the covering 410 may be applied via adhesive, or may include a removable lid. The removable covering 410 may serve as a label for the single-serving pod 102, as shown in FIGS. 17C and 17D.

In some embodiments, the bottom end 407 of the capsule 400 may be sealed as well. For example, as shown in FIG. 18A, the single-serving pod 102 may include a second removable covering 1102 disposed over the at least one smaller opening in the second end 407 of the capsule 400. The second removable covering 1102 may help to fully seal the capsule 400 by covering the holes on the bottom end of the capsule 400. This fully seals the beans against air inside the capsule 400, maintaining their freshness. This second removable covering 1102 would need to be removed along with the upper removable covering 410 before the pod 102 can be used as a dripper.

In other embodiments, the bottom end 407 of the capsule 400 may be left unsealed, without a covering over the drip holes. To seal in the freshness of the coffee beans therein, the single-serving pod 102 may be packaged in a sealed bag together with multiple other single-serving pods for storage and shipping to a user. This arrangement means that a user would only have to remove a single covering 410 when it is time to brew the coffee.

Each pod 102 of FIGS. 4 and 17A-D includes a filter 402 (e.g., coffee filter). For example, the capsule 400 and/or the filter 402 may be made from 100% eco-friendly materials that are renewable, biodegradable, and/or compostable. As an example, the capsule 400 and/or the filter 402 may be made from a 100% biodegradable material, such as sugar cane fiber or another plant-based fiber. As such, the single-serving pod 102 may pose a much smaller environmental impact compared to plastic or metallic coffee capsules.

As illustrated in FIG. 4, the plurality of whole coffee beans 408 may be located inside the coffee filter 402. Similarly, in the embodiment of FIG. 18A, the filter 402 is configured to hold whole coffee beans therein as well.

In the embodiment of FIG. 19, the single-serving pod 102 includes a removable container 1200 disposed within the capsule 400 and covered by the removable covering 410. The plurality of whole coffee beans for the pod 102 may be located in this removable container 1200, instead of loose in the filter 402 below. The removable container 1200 acts as a separate compartment to store and seal the beans from moisture and oxygen. This may enable the pod 102 to fully seal the coffee beans from the air without requiring an additional removable covering at the bottom end of the capsule 400. The removable container 1200 may include a septum 1202 configured to enable a user to easily grasp the removable container 1200 with their fingers to lift the removable container 1200 out of the capsule 400 and pour the beans into the brewer.

Numerous modifications, alterations, and changes to the described embodiments are possible without departing from the scope of the present invention defined in the claims. It is intended that the present invention not be limited to the described embodiments, but that it has the full scope defined by the language of the following claims, and equivalents thereof.

What is claimed is:

1. A coffee brewing system, comprising:

a grinder configured for grinding whole coffee beans into coffee grounds with adjustable coarseness, the grinder configured to receive the whole coffee beans through a first opening above the grinder and dispense the coffee grounds through a second opening below the grinder;

a brewer configured to dispense water for brewing coffee through a third opening below the brewer, the brewer positioned laterally relative to the grinder, the brewer comprising:

a stationary nozzle configured to dispense a laminar flowing water stream of the water in a downward direction, and one or more electrodes disposed adjacent to the water stream, the one or more electrodes configured to generate an electrical field which bends the water stream according to a selected pouring pattern;

a capsule dock configured to hold a capsule containing a coffee filter;

a linear positioning stage configured to linearly translate the capsule dock between a first position under the second opening of the grinder and a second position under the third opening below the brewer; and a controller configured to control the grinder, the brewer, the capsule dock, and the linear positioning stage, wherein the selected pouring pattern is determined based on a type of the coffee beans being used.

2. The coffee brewing system of claim 1, wherein the controller is further configured to initiate a brewing process when an integrated force sensor detects a force applied to a front end of the capsule dock.

3. The coffee brewing system of claim 1, further comprising an electronic reader configured to read an identification tag on the capsule, wherein the controller is further configured to adjust one or more settings of at least one of the grinder or the brewer based on information associated with the identification tag.

4. The coffee brewing system of claim 3, wherein at least one setting of the one or more settings adjusts a coarseness of coffee ground by the grinder.

5. The coffee brewing system of claim 3, wherein at least one setting of the one or more settings adjusts a temperature, a volume, or a pouring pattern of the water stream.

6. The coffee brewing system of claim 1, wherein the controller is further configured to cause the capsule dock to translate from the first position to the second position based on an indication of a completion of a grinding operation.

7. The coffee brewing system of claim 6, wherein the indication of the completion of the grinding operation is based on a weight of the capsule measured by an integrated force sensor of the capsule dock.

8. The coffee brewing system of claim 1, wherein the controller is further configured to cause the brewer to start a brewing process based on an indication that the capsule dock is at the second position under the brewer.

9. The coffee brewing system of claim 1, wherein the controller is further configured to receive instructions via a user interface configured to enable a user to specify a grind size, a water temperature, a water volume, or a coffee-to-water ratio.

10. The coffee brewing system of claim 1, wherein the controller is further configured to receive instructions via a user interface configured to present one or more brewing recipes for user selection, each brewing recipe specifying a predetermined brewing configuration for the coffee brewing system.

11. The coffee brewing system of claim 10, wherein the user interface is provided by an application on a user device separate from the coffee brewing system.

12. The coffee brewing system of claim 1, wherein the controller is further configured to receive instructions via a user interface configured to enable a user to specify brewing details associated with a plurality of pours to be used during a brewing process.

13. The coffee brewing system of claim 12, wherein the brewing details associated with each pour comprise a water temperature, a water volume, or a pouring pattern.

14. The coffee brewing system of claim 1, wherein the grinder comprises:

a burr assembly comprising an inner burr connected to a main shaft so as to rotate about an axis of the main shaft, and an outer burr encasing the inner burr; and a motor configured to adjust a gap between the inner burr and the outer burr.

15. The coffee brewing system of claim 14, wherein the gap between the inner burr and the outer burr affects a coarseness of the coffee ground.

16. The coffee brewing system of claim 15, wherein the controller is configured to cause the inner burr to move upward so as to decrease the gap between the inner burr and the outer burr thereby decreasing the coarseness of the coffee ground.

17. The coffee brewing system of claim 1, wherein the capsule dock further comprises:

a capsule holder configured to receive the capsule; and a connecting member configured to connect the capsule holder to the linear positioning stage.

18. The coffee brewing system of claim 1, wherein the linear positioning stage is further configured to selectively shake the capsule dock during a brewing process.

19. The coffee brewing system of claim 1, wherein the linear positioning stage comprises an integrated position sensor configured to detect whether the capsule is in a correct position for receiving the coffee grounds from the grinder or for receiving water from the brewer.

20. The coffee brewing system of claim 1, wherein the one or more electrodes include a plurality of electrodes surrounding the water stream.

* * * * *